(12) United States Patent
Dirk

(10) Patent No.: US 7,929,130 B2
(45) Date of Patent: *Apr. 19, 2011

(54) ILLUMINATION SOURCES AND CUSTOMIZABLE SPECTRAL PROFILES

(75) Inventor: Carl W. Dirk, El Paso, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/605,103

(22) Filed: Oct. 23, 2009

(65) Prior Publication Data

US 2010/0085563 A1    Apr. 8, 2010

Related U.S. Application Data

(63) Continuation of application No. 11/232,442, filed on Sep. 21, 2005, now Pat. No. 7,626,693.

(60) Provisional application No. 60/612,309, filed on Sep. 22, 2004.

(51) Int. Cl.
*G01J 3/00* (2006.01)
(52) U.S. Cl. ........................................................ 356/300
(58) Field of Classification Search .................. 356/300
See application file for complete search history.

(56) References Cited

U.S. PATENT DOCUMENTS

| | | | | |
|---|---|---|---|---|
| 5,173,808 | A | 12/1992 | Auer et al. | 359/722 |
| 5,267,061 | A | 11/1993 | Ansley et al. | 359/15 |
| 5,786,591 | A | 7/1998 | Asahi | 250/226 |
| 6,031,653 | A | 2/2000 | Wang | 359/247 |
| 6,075,872 | A | 6/2000 | McGuire | 382/100 |
| 6,154,708 | A | 11/2000 | Koachi | 702/40 |
| 7,387,405 | B2 | 6/2008 | Ducharme et al. | 362/231 |
| 7,626,693 | B1 | 12/2009 | Dirk | 356/300 |
| 7,663,739 | B2 | 2/2010 | Dirk | 356/72 |
| 2002/0012461 | A1 | 1/2002 | MacKinnon et al. | 382/164 |
| 2004/0105261 | A1 | 6/2004 | Ducharme et al. | 362/231 |
| 2004/0125607 | A1 | 7/2004 | Dirk | 362/458 |

(Continued)

FOREIGN PATENT DOCUMENTS

EP    1 122 588    8/2001

(Continued)

OTHER PUBLICATIONS

Office Communication issued in U.S. Appl. No. 10/688,200, mail date Aug. 29, 2008.

(Continued)

*Primary Examiner* — Tarifur Chowdhury
*Assistant Examiner* — Abdullahi Nur
(74) *Attorney, Agent, or Firm* — Fulbright & Jaworski

(57) ABSTRACT

Methods for generating a customized spectral profile, which can be used to generate a corresponding filter, lamp or other type of illuminant. A trial spectrum can be generated. A reference spectrum can be determined or otherwise obtained. A SOURCE spectrum can be determined or otherwise obtained. One or more optical indices can be calculated using the trial spectrum and one or more of the optical indices are optimized by varying the trial spectrum to generate the customized spectral profile. A radiation force parameter can be used to minimize unsafe build-up of light in spectral regions. Adaptations of color rendering parameters can be used in the optimization process. Smoothing parameters can be used to enable easier design of filter structures. A reflectance camera can be used to measure reflectance data at one or more pixels of a digital representation of an object to be illuminated.

17 Claims, 24 Drawing Sheets

U.S. PATENT DOCUMENTS

2010/0165337 A1    7/2010    Dirk .............................. 356/72

FOREIGN PATENT DOCUMENTS

| WO | WO 92/01557 | 2/1992 |
|---|---|---|
| WO | WO 94/14089 | 6/1994 |
| WO | WO 96/10211 | 4/1996 |
| WO | WO 01/36864 | 5/2001 |
| WO | WO 01/46617 | 6/2001 |
| WO | WO 02/63206 | 2/2002 |
| WO | WO 2004/036161 | 4/2004 |

OTHER PUBLICATIONS

Office Communication issued in U.S. Appl. No. 11/232,442, mail date May 15, 2008.

Office Communication issued in U.S. Appl. No. 12/648,714, mail date Jun. 24, 2010.

U.S. Appl. No. 12/466,589 "Filters and Methods for Customized Spectral Profiles," by Carl W. Dirk, filed May 15, 2009.

U.S. Appl. No. 12/780,546 "Filters, Illuminants, and Customized Spectral Profiles for Reducing Perceptible Changes in Appearance," by Carl W. Dirk, filed May 14, 2010.

Piegari, "Ultraviolet, visible and infrared performance of coated glass for museums," *Optical and Infrared Thin Films*, 4094:74-82, 2000.

Office Action issued in U.S. Appl. No. 10/688,200, mail date Mar. 5, 2009.

Office Action issued in U.S. Appl. No. 11/232,442, mail date May 15, 2008.

Weintraub, "The color of white: is there a 'preferred' color temperature for the exhibition of works of art?" *WAAC Newsletter*, 21(3):1-6, 2000.

Office Action, issued in related U.S. Appl. No. 10/688,200, mailed Aug. 29, 2008.

Figure 4

Calculation of Power and Luminosity Optimization Parameters

410 — Power of Trial spectrum relative to reference spectrum
Tp / Rp = %P

412 — Filter Efficiency of Trial spectrum relative to reference spectrum
TL / RL = %FE

414 — Lumens / Watt Efficiency of Trial spectrum relative to reference spectrum
(TL / Tp) / (RL / Rp) = %LWE

416 — 1988 CIE Pub. #86 Filter Efficiency of Trial spectrum relative to reference spectrum
TL1988 / RL1988 = %FE1988

418 — 1988 CIE Pub. #86 Lumens / Watt Efficiency of Trial spectrum relative to reference spectrum
(TL1988 / Tp) / (RL1988 / Rp) = %LWE1988

420 — Overall Efficiency of Trial spectrum relative to reference spectrum
%FE / %LWE = %OE

422 — 1988 CIE Pub. #86 Overall Efficiency of Trial spectrum relative to reference spectrum
%FE1988 / %LWE1988 = %OE1988

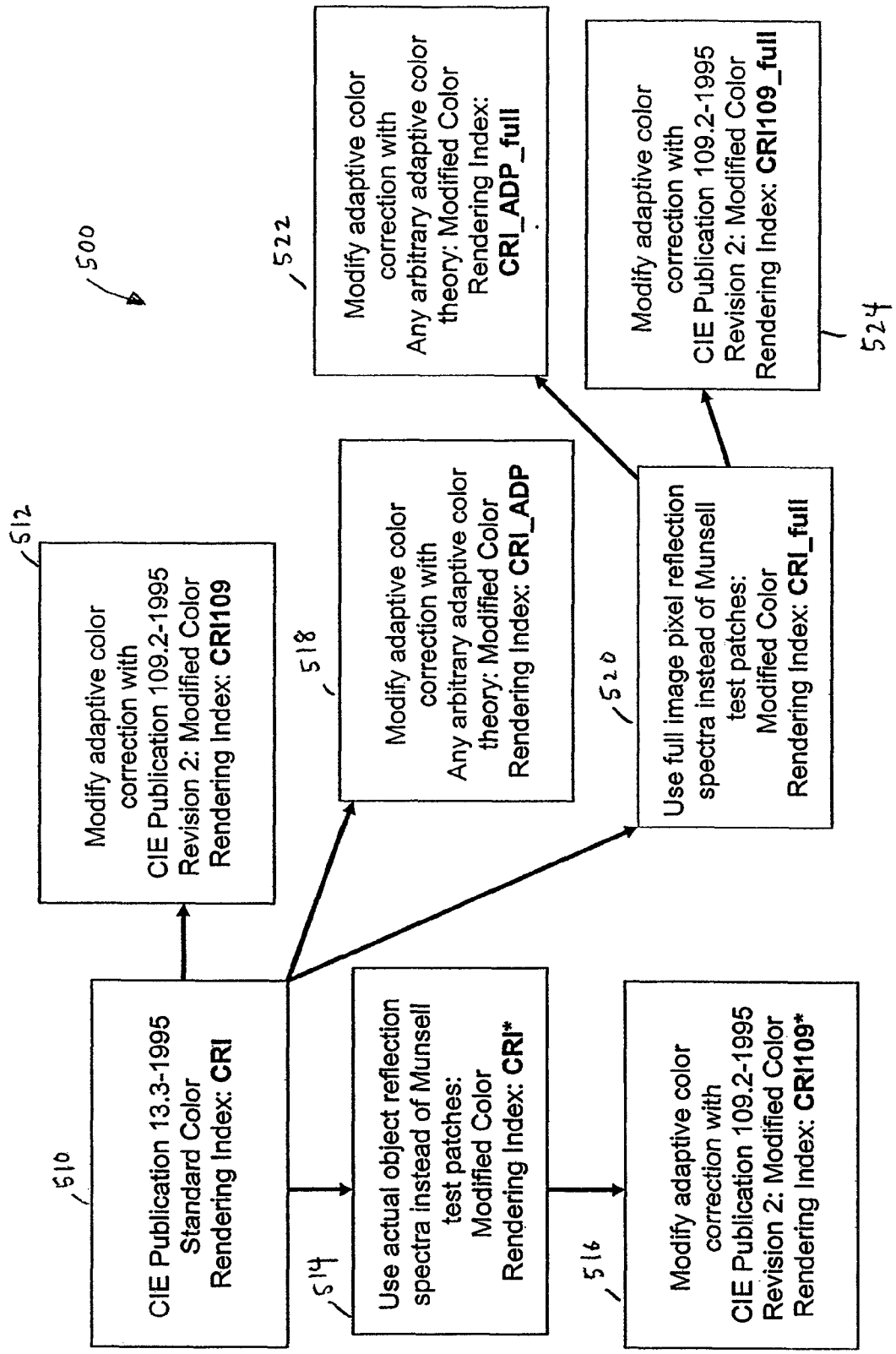

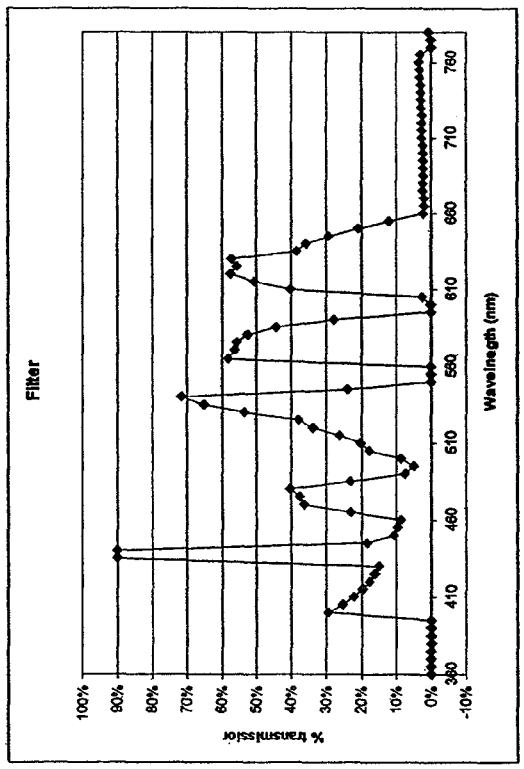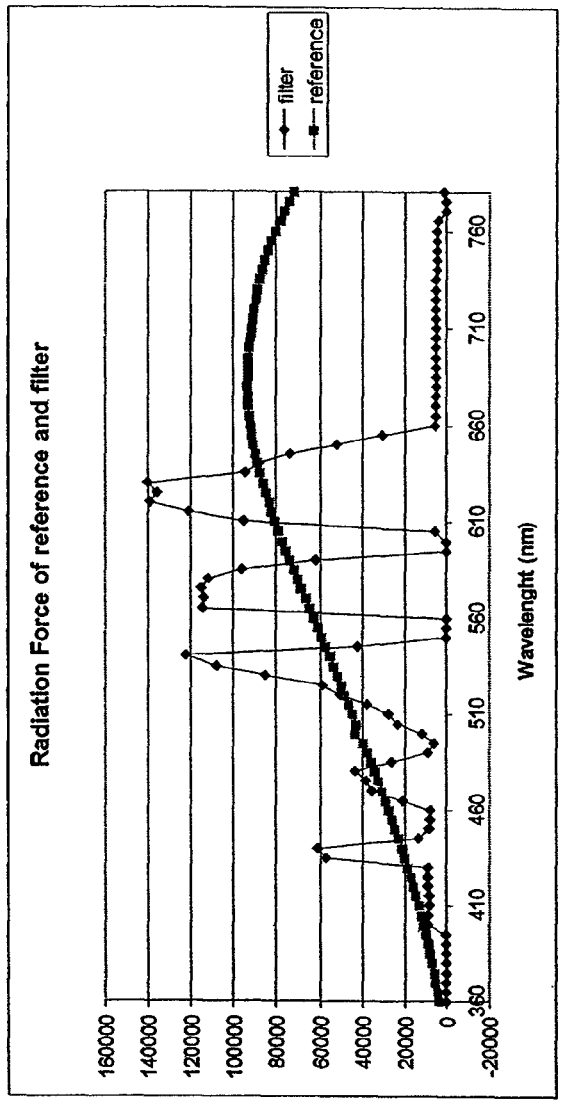
Figure 10

Figure 10A
A 50% power reduction filter (maintaining luminosity) with corresponding radiation force plot. Note relative to Figure 10 that extra radiation force in the blue is not as high
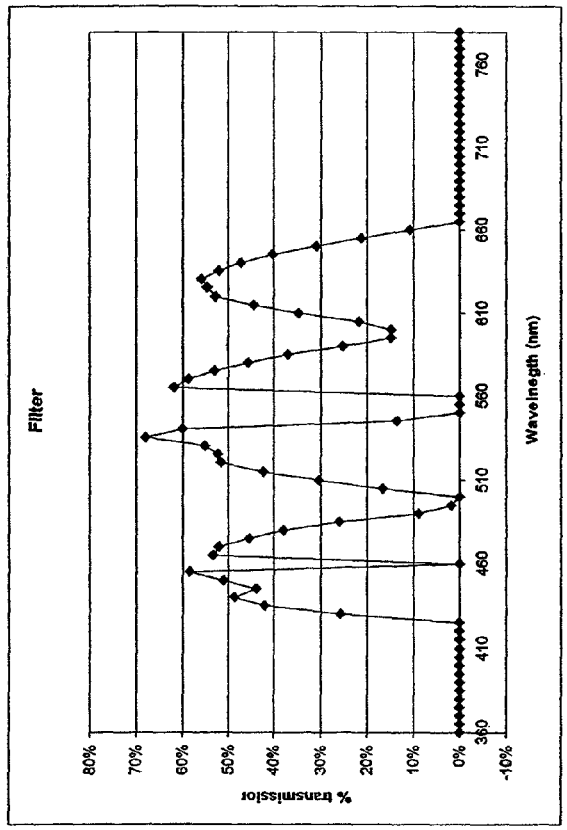
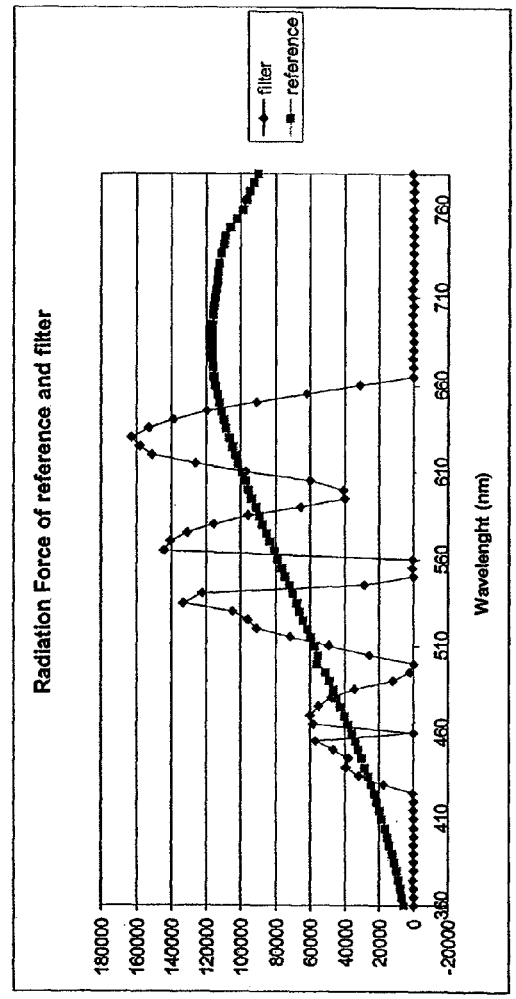

ILLUMINATION SOURCES AND CUSTOMIZABLE SPECTRAL PROFILES

This application is a continuation of, claims priority to, and incorporates by reference, U.S. patent application Ser. No. 11/232,442, filed Sep. 21, 2005; and claims priority to, and incorporates by reference, U.S. Provisional Patent Application Ser. No. 60/612,309, which was filed Sep. 22, 2004.

This application incorporates by reference U.S. patent application Ser. No. 10/688,200 entitled "Customizable Spectral Profiles for Filtering," by Carl W. Dirk, which was filed on Oct. 17, 2003.

BACKGROUND OF THE INVENTION

1. Field of the Invention

The present invention relates generally to optics, spectroscopy, and illumination sources. More particularly, the present invention relates to techniques for generating customized spectral profiles, which can be used to generate corresponding optical filters, lamps, or illuminants that have a particular spectral profile as a feature. Representative embodiments relate to spectral profiles that may be used for (a) protecting works of art or other objects subject to photochemical degradation, (b) aesthetically rendering objects, and/or (c) correcting the rendering of an object.

2. Background

It is known that the quality of light falling upon a work of art affects the degree to which that work of art will be damaged through photochemical processes. Photodamage of works of art, in turn, is an important concern not only for the financial well-being of museums, but also for the preservation of this and foreign cultures.

One of the most common methods to minimize photodamage is to minimize the amount of ultraviolet and/or infrared radiation that impacts artwork. Although this method may be somewhat effective, it unfortunately does not prevent damage to the artwork imposed by photons that do not significantly affect the color rendering of that artwork. In other words, today's solutions do not block visible-light photons that do not contribute to the visualization of the object. Put yet another way, today's solutions are not equipped to render only the necessary portions of photometric light—transmit visible-light photons that significantly affect the visualization of a particular object (e.g., light necessary for proper color rendering) while blocking photons unneeded for this task.

It is also known that the quality of light falling upon a work of art affects the aesthetics of that art. For instance, illumination by candlelight may give a work of art a different "look and feel" than when the art is illuminated by fluorescent lighting. While the underlying physical reasons for this difference are relatively complex, the fact remains that existing technology is ill-equipped at creating customizable filters, lamps, or other illuminants for aesthetically rendering an object. In particular, today's technology does not afford museums the opportunity to easily select different filters, lamps, or other illuminants that may be used to simulate, for instance, candlelight, torchlight, oil lamp lighting, sunlight, roomlight, mantle-light, gas light, etc. Further, today's technology does not afford museums the opportunity to create such filters, lamps, or other illuminants customized for a particular piece of art. Accordingly, many times, museum patrons cannot fully appreciate the way in which the artist himself or herself saw a particular work of art as it was being painted. Color contrast effects can depend strongly on the type of illuminant used, and present techniques provide no way to correct for the poor color contrasting effects due to some illuminants.

Finally, it is known that, in certain situations, the rendering of artwork by existing illumination may be degraded for one or more reasons. For instance, if a painting is damaged or particularly faded in one or more regions, existing illumination may do nothing to correct for the problem and may continue to exacerbate it. Further, if a viewer is suffering from a form of vision loss, one or more colors of a work of art may be diminished or otherwise affected relative to other colors. A common form of vision loss in adults is that the perception of blue light fades due to yellowing of the lens of the eye. Unfortunately, today's technology does not provide solutions to these types of problems.

These issues highlight problems existing in today's technology but are not meant to constitute an exhaustive list. Rather, they show that there is an important need for the techniques of this disclosure, which address concerns mentioned above.

SUMMARY OF THE INVENTION

Shortcomings of the prior art are reduced or eliminated by the techniques discussed in this disclosure. In illustrative embodiments, customized spectral profiles are created that can be used to generate corresponding optical filters, lamps, or other illuminants. In different embodiments, the spectral profiles may be customized for a particular object, such as a work of art. Profiles and corresponding filters, lamps, or illuminants can be made that (a) protect an object from photodamage, (b) aesthetically render an object, and/or (c) correct the rendering of an object. Example filters protect works of art while, at the same time, rendering them as if illuminated by candlelight, torchlight, oil lamp lighting, sunlight, roomlight, mantle-light, gas light, etc.

Certain techniques of this application build upon technology disclosed in the inventor's previous disclosure embodied in pending U.S. patent application Ser. No. 10/688,200, which has been incorporated by reference. Embodiments of the previous disclosure can involve combining trichromacy color theory with standard CIE color rendering theory (CIE 13.3) and modifying the CIE 13.3 method to incorporate specific reflection spectral data from the kind of materials one is wishing to protect—e.g., works of art. Several parameters were defined to effectively optimize to a desired spectral profile:

Chromaticity—This can be the standard CIE 1931 parameter and can be used to control color temperature and the blackbody distribution of light;

Filter efficiency—This parameter can be used to assure a particular level of transmission of luminosity;

Lumens/watt efficiency—This parameter can assure that total power on a target is reduced relative to luminosity produced;

Overall efficiency—The is a multiplication of the Filter efficiency and the Lumens/watt efficiency. Failing to maintain this greater than unity leads to Filter efficiency collapsing to zero;

Color Rendering Index (CRI)—This can be the standard CIE 13.3 method that permits assessment of a source with regard to its color rendering properties;

Color rendering Index* (CRI*)—This is a modification of CRI that uses real data from works of art or other objects rather than the standard 8 or 15 Munsell test patches that are typically used in CIE 13.3

Since the previous disclosure, the inventor has modified theories to calculate filter profiles. Some modifications include, but are not limited to the following:

1) The CIE 13.3 theory has been modified. This modification involves incorporation of a more modern adaptive color correction (ADC) to the color rendering index (CRI or CRI*). In one embodiment, this more modern ADC can be based on CIE 109, published about 1995. The original ADC built into CIE 13.3 is based on a theory from before 1900. In this disclosure, the modified CRI parameter is called "CRI109" (or CRI109*, which matches the terminology scheme used in the previous disclosure to indicate a modification based on real data from works of art or other objects. As those having ordinary skill in the art will recognize with the benefit of this disclosure, utilizing CRI109 can provide more flexibility. One can, for instance, more reliably optimize to spectral distributions that differ in color temperature (CT). The original CIE 13.3 method is not always suitable for optimizing far-off the CT of a reference or when one deviates significantly from Planckian blackbody distributions. This is due to the relatively primitive ADC built into the CIE 13.3 theory. Use of CRI109 provides more robustness to calculations of arbitrary distributions used in this disclosure. Moreover, the CIE 109 ADC theory varies with luminance on target, so adjustments can be made to control the effect of lighter or darker illuminations on CRI (or CRI*), as necessary. This, in turn, can be useful unto itself since one may need to optimize to specific lighting level conditions (e.g., 50 lux, 75 lux, 150 lux, etc.). CRI109 varies from 50-150 lux, and the standard method (CIE 13.3) doesn't see this effect.

2) Another modification entails reducing power on a target while maintaining luminance. This can be achieved to some degree using techniques of the previous disclosure; however, in some embodiments of the previous disclosure, one may "pile up" light in other spectral regions above the level of standard lamps. One may think that as long as power is being reduced, the end-effect is beneficial. But, depending on the energy of the light that is being piled-up, one may potentially create a different, harmful situation. An extreme example showing potential harm is revealed through comparison with a laser: all the power is piled into one narrow energy band and the laser can do damage at that energy because of this. By piling power up too much, one heads toward the extreme of that situation. The inventor has found that a solution to this scenario is to optimize away from it: i.e. optimize one or more parameters in order to avoid potentially-harmful energy pile-up. As this disclosure discusses in more detail below, one can create a new parameter, which is the power times the energy. This parameter has units of force, and in this disclosure it is called the Radiation Force (RF) parameter. The parameter can be implemented several ways. For example, one may sum the total RF across the spectrum and relate this to the total RF across a reference lamp to get a total relative RF (TRRF). In a representative embodiment, one wants to reduce power, making sure that the TRRF goes down. The two track in some way, but minimums in power do not necessarily lead to minimums in TRRF, and the reverse is true as well. Additionally, use of another new parameter can be beneficial: the relative RF (or, "RRF," which should be distinguished from the TRRF). RRF is able to indicate radiation force at specific wavelengths or in specific spectral regions. In different embodiments, one can minimize or optimize RRF in certain spectral regions to further ensure that harmful pile-up does not occur. Although one can design a filter or illuminant that reduces power without using these new parameters, use of the new parameters can lead to a better solution. Particularly, a solution can be fashioned that is safer and does not create potentially harmful light/energy pile-up at different portions of a spectrum.

Using the new RRF and TRRF parameters allows for several different optimization strategies. For instance, when the RRF appear unfavorable, one can use at least one or more of three different approaches in response:

a. Optimize away from the bad RRF situation;

b. Optimize to a different blackbody distribution. This shifts the distribution RF toward more desirable regions. This optimization can only be done with CRI109 since the standard CRI method is not sufficiently robust when the blackbody distribution is changed.

c. Determine experimentally whether the brightness of the distribution offsets the undesirable RRF. This may be considered a subtle concept: it is known that different colored lights are perceived as different in brightness. For instance, blue light is perceived as being 9 times brighter than yellow even though both may have identical measured luminance. However, since spectral distributions of this disclosure can be dissimilar to the lamps being simulated, one might expect them to vary significantly in perceived brightness. One can then use this perceived brightness to offset RRF.

3) Another modification concerns making filters. Filter manufacture is complicated by filter profiles that involve abrupt, sharp changes in intensity. In order to minimize this problem, the inventor has developed a first derivative and second derivative smoothing parameter. When applied under the constraints of an optimal profile, these parameters permit one to smooth the profile while otherwise maintaining other parameters in an optimal domain.

In one embodiment, the invention involves a method for generating a customized spectral profile, where a trial spectrum is generated; a reference spectrum is obtained; a SOURCE spectrum is obtained; one or more optical indices of the trial spectrum, reference spectrum, and SOURCE spectrum are calculated, and one or more optical indices are optimized by varying the trial spectrum to generate the customized spectral profile. Here the capitalized "SOURCE" designates an illuminant that is behind a filter being designed via the customized spectral profile. The filter may include, but is not limited to, various mechanisms of filtering including interference, absorptive loss, scatter, etc., or combinations thereof.

In another embodiment, the invention involves a method for generating a customized spectral profile, where a trial spectrum is generated; a radiation force parameter of the trial spectrum is calculated; and the radiation force parameter is optimized by varying the trial spectrum to generate the customized spectral profile.

In another embodiment, the invention involves a method for generating a customized spectral profile, where a trial spectrum is generated; a smoothing parameter of the trial spectrum is calculated; and the smoothing parameter is optimized by varying the trial spectrum to generate the customized spectral profile.

In another embodiment, the invention involves a method for generating a customized spectral profile for illuminating an object, where a trial spectrum is generated; one or more optical indices of the trial spectrum are calculated using a camera that measures reflectance spectrum at one or more pixels of a digital representation of the object; and one or more optical indices are optimized by varying the trial spectrum to generate the customized spectral profile.

In another embodiment, the invention involves a method for generating a customized spectral profile, where a trial spectrum is generated; a reference spectrum is obtained; one or more optical indices of the trial spectrum are calculated; one or more corresponding optical indices of the reference spectrum are calculated; and the trial spectrum is varied to optimize the one or more optical indices of the trial spectrum with respect to the one or more corresponding optical indices of the reference spectrum, thereby generating the customized spectral profile.

In any embodiment, the optical indices can include one or more of chromaticity, filter efficiency, lumens per watt efficiency, overall filter efficiency, watt reduction criteria, radiation force, profile smoothing, color rendering index, and modified color rendering index. Any one embodiment can include any of the other indices or parameters discussed or illustrated herein, alone or in any combination.

One or more of the optical indices can correspond to a specific object to be illuminated, and that object may be a work of art. Varying the trial spectrum can entail changing one or more parameters of contributing functions of the trial spectrum or changing individual values of the trial spectrum at different wavelengths.

The customized spectral profile can be such that it renders only photometric light, or tailored regions of photometric light. The spectral profile can be such that it aesthetically renders an object. The customized spectral profile can be, for example, a candlelight profile that can render the object as if illuminated by candlelight. Additionally or alternatively, the customized spectral profile can be a torchlight profile that can render the object as if illuminated by torchlight, a fluorescent profile that can render the object as if illuminated by fluorescent lighting, an incandescent profile that can render the object as if illuminated by incandescent profile, a halogen profile that can render the object as if illuminated by halogen-based lighting, an oil lamp profile that can render the object as if illuminated by an oil lamp, a daylight profile that can render the object as if illuminated by sunlight, a roomlight profile that can render the object as if illuminated by sunlight or candlelight scattered in a room, a gas light profile that can render the object as if illuminated by a gas light, a lime light profile that can render the object as if illuminated by a lime light, and/or a mantle-light profile that can render the object as if illuminated by a Welsbach mantle.

Alternatively, the spectral profile can be an emphasis profile for emphasizing one or more colors of an object, a spectral profile for correcting the rendering an object, or a profile for correcting the rendering of an object for an eye experiencing loss of vision with respect to one or more colors.

Computers and computer software can be used in conjunction with any of the calculating or other computer-amenable steps discussed or illustrated in this disclosure. For example, steps of any of the embodiments of this disclosure can be aided or done through computational algorithms of a computer. For examples, method steps can be done via corresponding instructions within software.

In one embodiment, the invention correspondingly involves computer-readable media including instructions for: generating a trial spectrum; calculating one or more optical indices using the trial spectrum, a reference spectrum, and a SOURCE spectrum; and optimizing one or more of the optical indices by varying the trial spectrum to generate a customized spectral profile.

In another embodiment, the invention involves the optical filter, lamp, or other illuminant generated from a customized spectral profile that was created by way of the techniques of this disclosure. For example, the invention can involve a lamp, a LED, or any other type of illuminant.

In another embodiment, the invention involves the construction and use of a camera that records a reflection spectrum at one or more pixels (e.g., every pixel) of an image so that a filter can be optimally tuned to a given object or the image of that object can be used to test a hypothetical filter profile. The information from neighboring pixels and regions can be used to optimize, e.g., color contrast effects of the object within the scope of application of opponent color theory when illuminated with an illuminant designed using embodiments of this disclosure.

In another embodiment, the invention involves the ability to optimize an optical filter that will not have unsafe spectral concentrations of light while reducing the overall power of the filter. This can be accomplished with a parameter which weights the energy of a spectral portion of light with its power.

In another embodiment, the invention involves the design of an optical filter to be used with a fiber optic illumination system to optimize the spectral profile of the fiber optic system as stated in embodiments of the invention.

In another embodiment, the invention involves an optical filter, lamp, or other illuminant including means for exhibiting one or more optical indices optimized by varying a trial spectrum. The optical indices are calculated using the trial spectrum.

In another embodiment, the invention involves techniques for the smoothing a tailored trial spectrum while maintaining other advantageous spectral parameters to render a more easily manufactureable optical filter.

As used herein, "a" and "an" shall not be interpreted as meaning "one" unless the context of the invention necessarily and absolutely requires such interpretation.

As used herein, "painting" and "work of art" shall not be interpreted as being limited to objects unto which paint has been applied or which require the skills or opinion of an artist to define the nature of the object.

Other features and associated advantages will become apparent with reference to the following detailed description of specific embodiments in connection with the accompanying drawings.

BRIEF DESCRIPTION OF THE DRAWINGS

The techniques of this disclosure may be better understood by reference to one or more of these drawings in combination with the detailed description of illustrative embodiments presented herein. Identical reference numbers signify identical or similar elements.

FIG. 4 is a schematic diagram of aspects of generating a customized spectral profile in accordance with embodiments of the present disclosure. Power reduction is calculated. Filter efficiencies are calculated. Lumens per watt efficiencies are calculated. Overall filter efficiencies are calculated.

FIG. 5 is a schematic diagram of aspects of generating a customized spectral profile in accordance with embodiments of the present disclosure. Color rendering indices criteria and modified color rendering indices are calculated.

FIG. 10 is a schematic diagram of aspects of generating a customized spectral profile in accordance with embodiments of the present disclosure. A 50% power reduction filter is shown along with a corresponding radiation force plot.

FIG. 10A is a schematic diagram of aspects of generating a customized spectral profile in accordance with embodiments of the present disclosure. A 50% power reduction filter is shown along with a corresponding radiation force plot. Note the difference in radiation force with respect to FIG. 10A.

DESCRIPTION OF ILLUSTRATIVE EMBODIMENTS

Figure 1:
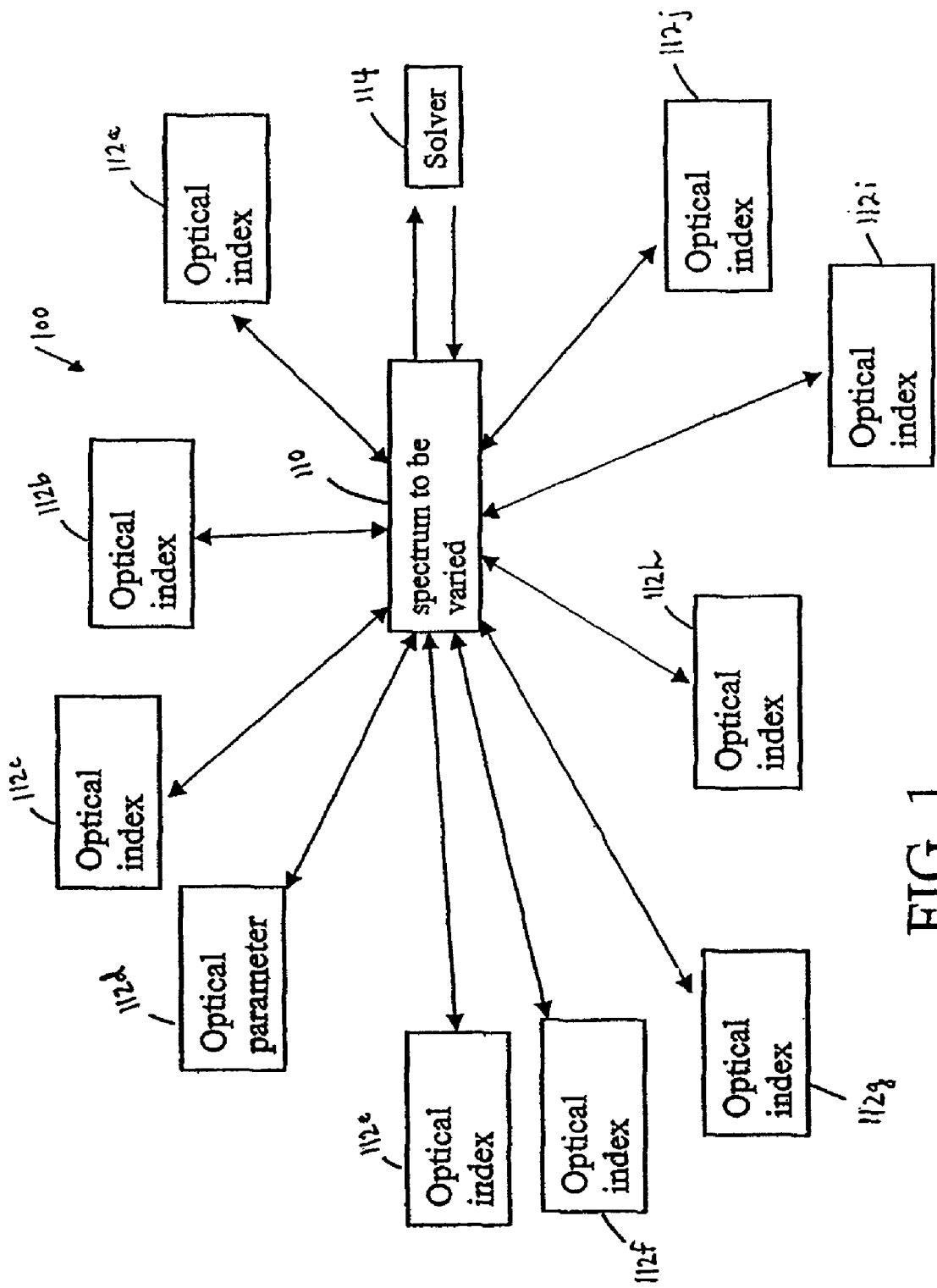
FIG. 1 is a general schematic diagram of a method for generating a customized spectral profile in accordance with embodiments of the present disclosure.

In general, the present invention provides techniques for generating customized spectral profiles, which can be used to generate corresponding optical filters, lamps or other illuminants customized to a spectral profile. Representative embodiments relate to spectral profiles that may be used to generate optical filters, lamps, or other types of illuminants that (a) protect objects such as works of art, (b) aesthetically render objects, and/or (c) correct the rendering of an object. Other uses of the spectral profiles will be apparent to those of ordinary skill in the art, having the benefit of this disclosure.

Custom spectral profiles may be created according to a particular visualization application. Once the custom spectral profile is created, a corresponding filter, lamp, or other illuminant can be built to realize that spectral profile. This filter could be of the interference type, the absorptive loss type, or a combination of these types. Different visualization applications have different requirements. For instance, if a goal is to protect works of art from light damage, one may require a filter that (a) blocks unnecessary photons (photons that do not affect the visualization or color rendering of the art) while (b) allowing a quantity of photons that do affect visualization to pass through the filter. In other words, a goal may be to transmit photometric light or tailoring the photometric and/or radiometric profile while blocking other light. If a goal is to render art as it would look under candlelight or a different type of illumination, one requires a filter or an illuminant that blocks particular photons so that the light passing through the filter or provided by the illuminant has the quality of candlelight or the other type of lighting being simulated. Similarly, if a goal is to render a piece of art so that the red or blue light quality (or a combination of light qualities) is enhanced or softened or a contrasting color effect is desired, a corresponding filter or illuminant would be required with the necessary properties built-in.

For all these applications, the corresponding spectral profile (to be generated) may depend on the qualities of the object being illuminated. For instance, one spectral profile may be suitable to block unnecessary photons for object A but not for object B (since object A and object B may comprise very different color schemes, textures, etc.). As well, the necessary incident photons for two objects may differ, and would require different filters, lamps, or other types of illuminants which would fulfill the necessary respective spectral profiles of each object.

An example general embodiment of the present invention involves the following: (a) defining a set of optical indices (generalized or for a particular object) to be optimized; (b) generating a custom spectral profile meeting the optimization requirements, e.g., for a given illumination source; and (c) generating a filter, lamp, or other type of illuminant according to the spectral profile. In an example embodiment, step (b) may entail (i) determining wavelength regions to be filtered; and (ii) determining the degree of filtration for those wavelength regions. In another example embodiment, step (b) may entail designing a lamp with the properties of the spectral profile.

In different embodiments, the generation of a custom spectral profile is aided through the use of a camera that images the reflectance spectra of pixels of a digital representation (e.g., in one embodiment, each pixel is imaged) of the object to be illuminated. The camera includes control software that embodies that operation. Use of such a camera permits the direct design of a filter, lamp, or other illuminant designed specifically for illumination of a unique object. The camera also permits optimization of specialized colorimetry effects such as color contrast in the design of the filter, lamp, or other type of illuminant.

Having the ability to generate customized spectral profiles and filters, lamps and other illuminants leads to great advantages. First, one may create profiles and filters, lamps and other illuminants that protect works of art and other objects from damage resulting from photochemical processes. This protection may stem from the blocking of all (or a significant portion of) non-photometric light, and as well may include blocking spectral portions of photometric light. Second, one may create profiles and filters, lamps or other illuminants that affect the aesthetics of works of art and other objects. For instance, illumination by candlelight, torchlight, oil lamp lighting, sunlight, roomlight, mantle-light, gas light, etc. may be simulated. At the same time, this aesthetic quality of light may be afforded while protecting the object from photochemical degradation. Third, one may create profiles and filters, lamps or other illuminants that correct for problems in rendering objects such as, but not limited to, problems stemming from vision loss and problems stemming from damaged objects. With the benefit of the present disclosure, all of these profiles and filters, lamps or illuminants may be custom-made for one particular object. For instance, a candlelight filter that also protects against damage may be custom-made for a particular painting, taking into account the particular color scheme of that painting.

For museum applications, it is contemplated that each piece of art may be fitted or illuminated with its own custom protective and/or aesthetic and/or corrective filter, lamp, or other type of illuminant. As will be recognized by those having skill in the art, this provides for great advantages including, but not limited to, financial benefits resulting from works of art "lasting" longer before restoration work is needed. Alternatively, more general filters, lamps, or other types of illuminants can be made to achieve the same or similar purposes, i.e., such filters, lamps, or illuminants would not be specifically tailored for one particular object. Room windows could be fitted with filters to control the detrimental effects of exterior light and help render effects within the room or upon the objects of the room to improve or modify their visual perception.

The figures of this disclosure show representative, but non-limiting, embodiments of aspects of the invention. Turning first to FIG. 1, a generalized schematic diagram of a method 100 for generating a customized spectral profile is shown. Included are a spectrum to be varied 110, a solver 114, and a plurality of optical indices 112$a$-$j$.

The method of FIG. 1 operates as follows. Spectrum 110 is a light spectrum generated by the practitioner or another. It, along with other parameters such as source illumination parameters, reference illumination parameters, and object parameters may be used to calculate one or more optical indices 112. The different optical indices 112 generally represent quantities or properties that the practitioner wants to use for comparison, optimize, or generally control, in order to achieve a desired filter or a desired filter characteristic. Depending on the particular application, different optical indices may be considered for optimization or for comparison (e.g., comparison with indices associated with a reference). For instance, if filter or illuminant efficiency is a primary concern, one or more efficiency indices may be represented by optical indices 112. If, on the other hand, a primary goal of a filter or illuminant is its ability to accurately color-render a work of art, one or more different color rendering indices may be included within the optical indices 112. If a combination of optical indices is important, each may be included (or a subset may be included). Even indices not necessarily important for the end-result may be included within the group of indices. For example, if one simply wants to monitor how one index is affected by the optimization of another index, both indices may be included and considered. Shown in FIG. 1 are ten optical indices. However, more or fewer may be used, as will be understood by those of ordinary skill in the art.

Once an initial spectrum 110 and optical indices 112 are selected, one may vary the spectrum 110 and monitor how the optical indices 112 correspondingly change. The spectrum 110 may be varied in any number of ways as will be apparent to those of ordinary skill in the art. In representative embodiments, spectrum 110 is made up of different mathematical functions termed "contributing functions." Those contributing functions may be varied mathematically to vary the spectrum 110. Alternatively, individual values of spectrum 110 may be changed at different wavelengths or at different ranges of wavelengths. Of course, combinations of these two representative methods may be used, or any other technique to vary one or more characteristics of the spectrum 110 so as to affect a change in one or more indices 112 may also be used. One may also monitor optical indices relative to spectra that do not necessarily change. For instance, one may monitor optical indices relative to a spectrum representing a source of illumination (e.g., a lamp or other illuminant behind a filter) or a reference (e.g., a lamp, a filtered lamp, or other illuminant that serves as a reference). The optical indices associated with one or more such spectra can be used in conjunction with optimization or for comparisons with other indices.

The type and degree of variation applied to spectrum 110 may vary according to application. In applications in which there is a high sensitivity between spectrum 110 and one or more key indices 112, the degree of variation applied to spectrum 110 may be made small (and numerous). Alternatively, larger, "rougher" changes to the spectrum may be used as well. The type of variation may be targeted or random. By "targeted" variation, it is meant that the spectrum 110 may be changed in a way believed to favorably affect one or more of the optical indices 112. To achieve targeted variations, one may use one or more neural network applications so that appropriate targeted variations may be "learned" over time. By "random" variation, it is meant that the spectrum 110 may be changed in a seemingly-random manner until a desired result in one or more of the optical indices 112 is achieved. Of course, other types and degrees of variation may be employed, as long as the variations affect a change in one or more of the indices 112.

The spectrum 110 is varied until one or more of the optical indices 112 are optimized for a desired result or yield a favorable comparison to other indices (e.g., indices associated with a reference). For example, consider that a desired result is that optical index 112$a$ have a value greater than X while optical index 112$g$ have a value less than Y. In that case, spectrum 110 is varied until those conditions are met. At that point, the optical indices 112$a$ and 112$g$ are said to be optimized, and the spectrum 110 then represents a customized spectral profile. In fact, it is customized for the application in which optical index 112$a$ has a value greater than X while optical index 112$g$ has a value less than Y. As will be discussed herein, these indices may, in turn, correspond to one or more characteristics of the particular object being illuminated (e.g., its color scheme, brightness, contrast, etc.).

Solver 114 may be used to both vary spectrum 110 and also to optimize one or more of optical indices 112. In particular, solver 114 may be a computational program that varies spectrum 110, monitors the corresponding values of one or more of optical indices 112, determines if optimization has occurred, and repeats the process until optimization is achieved (or until a time-out condition occurs, if optimization is not possible or would be too time-consuming). The exact interface of solver 114 may vary widely. In one embodiment, solver 114 may be the SOLVER feature of MICROSOFT's EXCEL spreadsheet. The SOLVER feature allows different fields to be varied until other fields match one or more requirements. In other embodiments, solver 114 may include software that allows the user to enter which optical index or indices are to be optimized, their optimization values, how the spectrum 110 should be varied, etc. The software may include a graphical user interface or the like. It may include a neural network component if desired as discussed above.

Once spectrum 110 represents a customized spectral profile (upon optimization), a corresponding customized filter or illuminant may be created by any of several manufacturing mechanisms known in the art. For instance, those of ordinary skill in the art may utilize known techniques to realize a dielectric filter from a particular profile. Any other type of filter other than dielectric filters may be employed, as long as they can be made to correspond to a given profile. Likewise, a lamp or other illuminant characterized by the spectral profile can be manufactured.

Figure 1A:
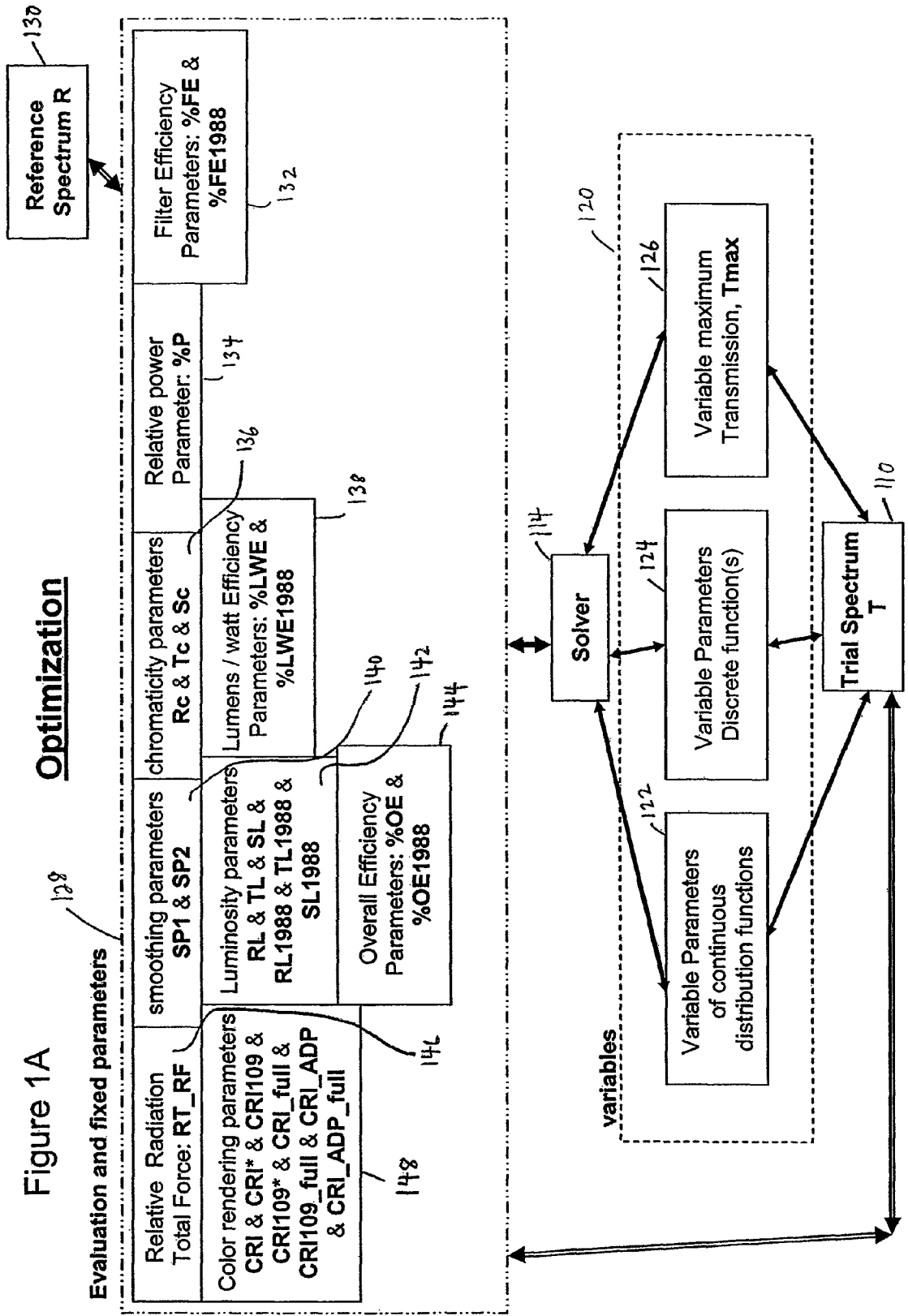
FIG. 1A is a general schematic diagram outlining an example method for generating a customized spectral profile in accordance with embodiments of the present disclosure. Specific indices are summarized in schematic form and show variable parameters, evaluation and fixed parameters, and input of trial and reference spectra. Further description of these variables and parameters are also provided in subsequent figures.

FIG. 1A is similar to FIG. 1, and common areas of description will not be repeated. FIG. 1A is representative of preferred embodiments and brings together concepts from the other figures of this disclosure. In the embodiment of FIG. 1A, a reference source spectrum 130 is measured or otherwise obtained prior to optimizing trial spectrum 110. In general, the reference spectrum 130 can represent any spectrum that drives one or more of the indices of FIG. 1 (or other indices discussed herein) and can be used so that those indices can be compared to, or optimized against, the corresponding indices driven by the trial spectrum 110 and/or a SOURCE spectrum, which will be described below.

In a representative embodiment, the reference spectrum 130 represents a spectrum of an existing illuminant found to be useful. For example, if a museum is currently illuminating a piece of art with illuminant X, the reference spectrum 130 can represent that illuminant. If the museum is generally pleased with the performance of illuminant X, its corresponding reference spectrum 130 and associated indices provide valuable information for designing a new filter or illuminant. For example, several properties of reference spectrum 130 (as revealed through one or more indices) can be preserved to the extent possible when designing a trial spectrum 110. Other properties (e.g., potentially harmful power distribution properties), however, can be improved. By comparing indices of the reference spectrum 130 with those of the trial spectrum 110, a filter or illuminant can be produced that improves the performance of illuminant X, but in an unobtrusive way—in other words, to a museum operator or viewer, a new illuminant designed through comparison with reference spectrum 130 may "look and feel" the same as original illuminant X, but it may better protect the object being illuminated. Thus, the reference source spectrum 130 can be used by those who wish to specify a suitable model illumination toward which the trial spectrum 110 should be optimized to achieve an illumination or one or more certain desired parameters of the reference.

Indices 112 of FIG. 1 are shown as evaluation and fixed parameters 128 of FIG. 1A. Some indices can be called fixed parameters to the extent that they can be held while other parameters vary. Some indices can be called evaluation indices to the extent that they are used to evaluate one or more other indices or qualities of the trial spectrum 110. Some evaluation indices can be used for comparison with reference spectrum 130. Several evaluation and fixed parameters 128 are shown: filter efficiency parameters 132, power parameters 134, chromaticity parameters 136, lumens/watt efficiency parameters 138, smooth parameters 140, luminosity parameters 142, overall efficiency parameters 144, radiation force parameters 146, and color rendering parameters 148. These parameters are described by their respective titles and are discussed more below.

As discussed above, one or more of these parameters can be optimized to achieve a desired result. For instance, one or more parameters may be optimized to match as closely as possible to corresponding parameters of reference spectrum 130, while other parameters may be optimized away from the reference and towards a particular value and range in order to improve upon the reference (e.g., to better protect work of art or other objects while maintaining the same or similar rendering characteristics).

FIG. 1A also shows variables 120 that affect trial spectrum 110. Variables 120 include variable parameters of continuous distribution functions 122, variable parameters of discrete functions 124, and variable maximum transmission (Tmax) 126. With solver 114, one or more of the variables is modified to change the trial spectrum 110 and its corresponding evaluation and fixed parameters 128. Through the optimization process, the variables settle through one or more iterations, and trial spectrum 110 is then finalized (i.e., a customized spectral profile has been generated). This spectrum, in turn is used to manufacture a corresponding filter or illuminant with the desired properties.

As will be apparent to those of ordinary skill in the art having the benefit of this disclosure, depending on which optical index or indices are optimized, one may achieve virtually any type of filter or illuminant. Representative filters include, but are not limited to, filters that (a) protect an object from photodamage, (b) aesthetically render an object, and/or (c) correct the rendering of an object.

Attention will now be turned to FIGS. 2-8, which also show example, non-limiting ways to implement the invention. FIGS. 2-8 can be viewed in conjunction with FIG. 1 and more particularly with FIG. 1A.

Figure 2:
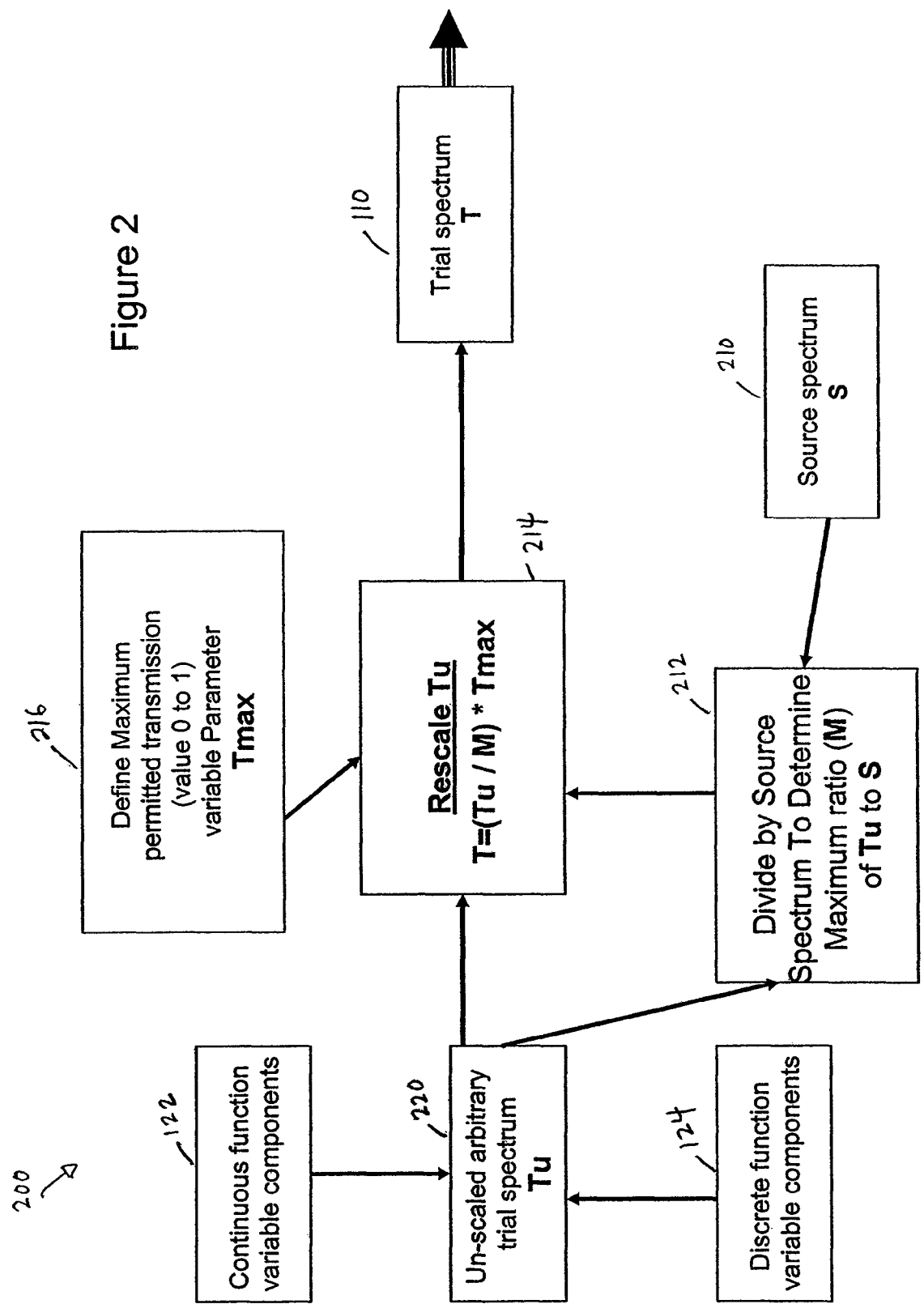
FIG. 2 is a schematic diagram of aspects of generating a customized spectral profile in accordance with embodiments of the present disclosure. A trial spectrum is generated.

FIG. 2 shows methodology for generating an initial trial spectrum 110, which may later be varied as discussed in relation to FIG. 1 and FIG. 1A. As illustrated in FIG. 2, trial spectrum 110 may be generated from one or both of an arbitrary wavelength profile or a linear combination of arbitrary mathematical functions. The mathematical functions may be of any type known in the art suitable for approximating or representing a spectrum. For filter-related embodiments, generating a trial spectrum 110 requires knowledge of the SOURCE that will provide light to pass through the intended filter. In those embodiments, the SOURCE spectrum 210 must be measured or otherwise obtained prior to determining the initial trial spectrum 110. In other embodiments, the SOURCE spectrum 210 would not be necessary if one were modeling a trial spectrum 110 intended to be made into a lamp or some other type of illuminant rather than a filter. Trial spectrum 110 is designated as the variable T in subsequent figures, SOURCE spectrum 210 is designated with an S, and reference spectrum 130 (see FIG. 1A) is designated with an R.

Individual steps within method 200 of FIG. 2 are self-explanatory. SOURCE spectrum 210 is measured or otherwise obtained. In an example embodiment, SOURCE spectrum 210 can correspond to a lamp spectrum or the spectrum of another illuminant (e.g., a halogen light, a tungsten lamp, a fluorescent lighting tube, etc.). In step 220, an un-scaled arbitrary trial spectrum Tu is formed via continuous function variable components 122 and discrete function variable components 124 (see also FIG. 1A for an illustration of these variables). In step 216, a maximum permitted transmission variable parameter Tmax is defined (see variable 126 of FIG. 1A). In step 212 a maximum ratio M of Tu to S is determined. Tu is then resealed in step 214 using Tu calculated in step 220, Tmax defined in step 216, and M determined in step 212. The result is trial spectrum, T, 110.

Figure 3:
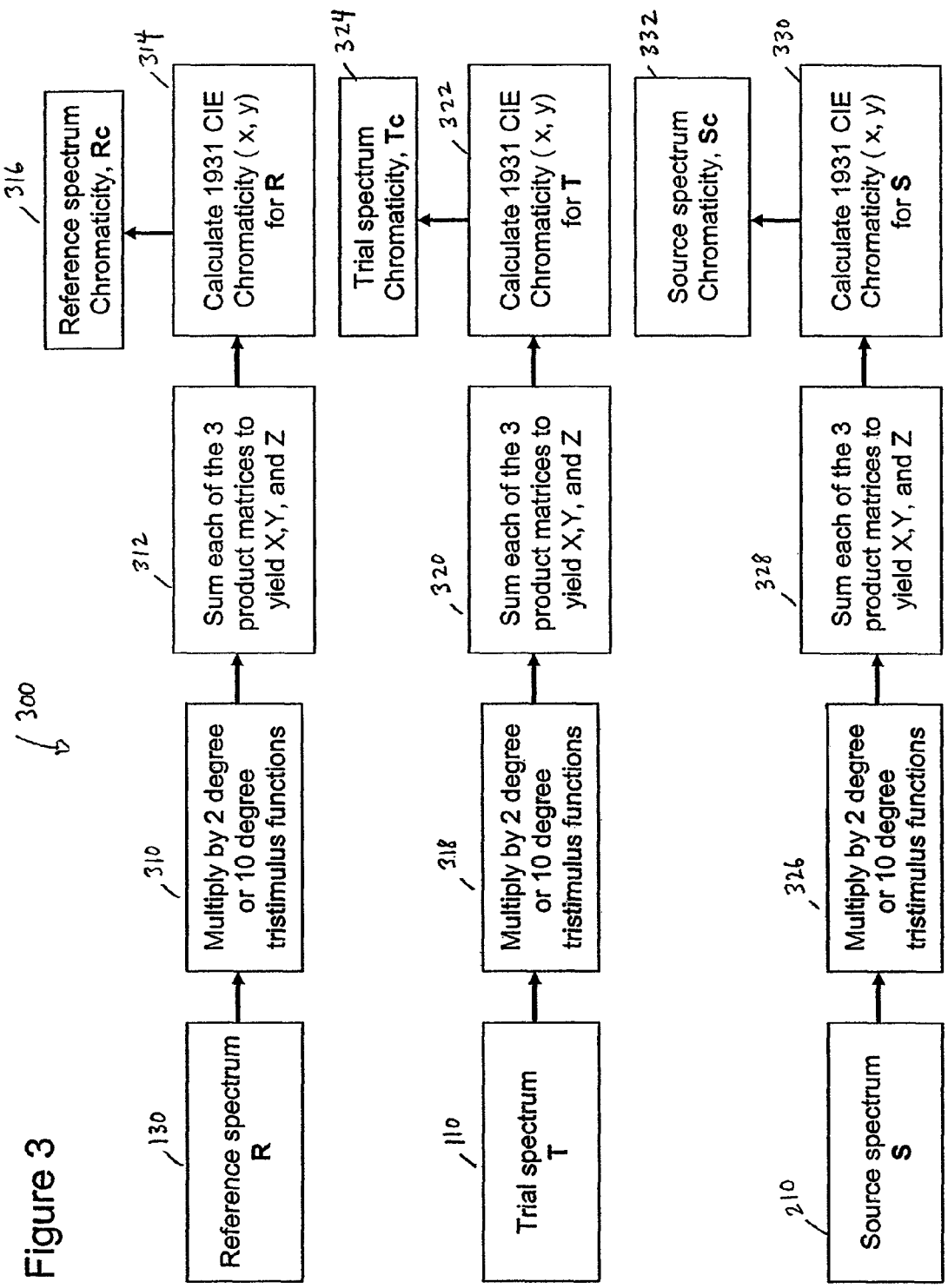
FIG. 3 is a schematic diagram of aspects of generating a customized spectral profile in accordance with embodiments of the present disclosure. Chromaticities are calculated.

FIG. 3 shows example methodology 300 for calculating chromaticity indices. In the illustrated embodiment, chromaticities are calculated for the trial spectrum 110, SOURCE spectrum 210, and reference spectrum 130. Calculating each of these chromaticities is achieved along similar lines. In steps 310, 318, and 326, the spectrum at issue is multiplied by 2 or 10 degree CIE tristimulus functions. These functions are known in the art. In different embodiments, other functions known in the art may be used additionally or instead. In steps 312, 320, and 328 one sums each of the three product matrices to yield X, Y, and Z. Techniques to implement this mathematical step are also known in the art. In steps 314, 322, and 330, one may calculate the 1931 CIE chromaticity (x,y) for the spectrum at issue. The mathematical underpinnings of this step are known in the art. What results from these calculations is a trial spectrum chromaticity Tc 324, a SOURCE spectrum chromaticity Sc 332, and a reference spectrum chromaticity Rc 315. Each of these may represent an optical index illustrated, e.g., in FIG. 1, and, accordingly, one or more of these indices may be chosen for optimization to generate a customized spectral profile, which may then be used to generate a corresponding filter, lamp, or other illuminant.

In one embodiment, by using the Planck Blackbody formulae known in the art, one may adjust the power distribution of filter light relative to an unfiltered source by way of "setting" the chromaticity of the filtered light. In other words, by optimizing the trial spectrum chromaticity to a desired value, one may advantageously adjust the power distribution of filter light relative to the unfiltered source to arrive at a desired custom filter.

FIG. 4 shows example methodology for calculating separate power and filter efficiency parameters. Box 410 corresponds to a power of the trial spectrum relative to the reference spectrum. Box 412 corresponds to a filter efficiency of the trial spectrum relative to the reference spectrum. Box 414 corresponds to lumens/watt efficiency of the trial spectrum relative to the reference spectrum. Box 416 corresponds to CIE Pub. #86 filter efficiency of the trial spectrum relative to the reference spectrum. Box 418 corresponds to CIE Pub. #86 lumens/watt efficiency of the trial spectrum relative to the reference spectrum. Box 420 corresponds to overall efficiency of the trial spectrum relative to the reference spectrum. Box 422 corresponds to CIE Pub. #86 overall efficiency of the trial spectrum relative to the reference spectrum.

Figure 8:
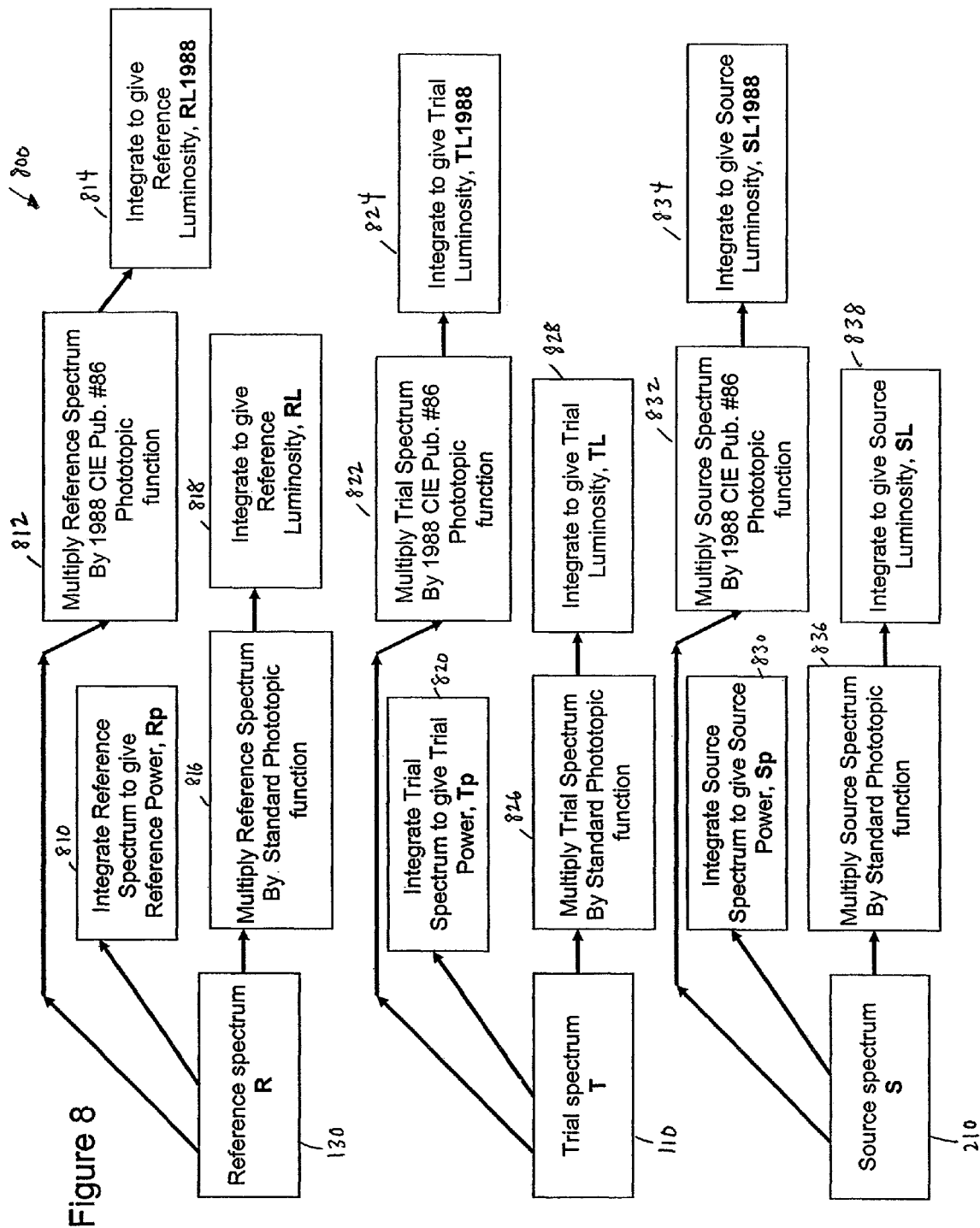
FIG. 8 is a schematic diagram of aspects of generating a customized spectral profile in accordance with embodiments of the present disclosure. Power and Luminosity parameters are calculated.

Parameters for these efficiencies are presented in FIG. 8 as separate optimization indices. The "1988" designation on some parameters signifies the use of the photopic function from CIE Publication #86. Lacking this designation implies the use of the standard phototopic observer function, $V\lambda$. The Power efficiency (% P) shows the level of radiometric power from the trial spectrum profile versus the reference spectrum. This parameter varies from zero to 100% as long as the power transmitted from the filtered SOURCE is never greater than the power from the reference illuminant. This parameter, in effect, becomes watt reduction criteria when minimized. The Filter efficiencies (% FE & % FE1988) represent the luminous efficiency of the trial spectral profile versus the reference spectrum. Typically, one wishes to maintain % FE while reducing % P in most optimizations. The Lumens per Watt efficiencies (% LWE & % LWE1988) represent the relative enhancement of luminous light over all radiometric light when comparing the trial spectral profile to the reference spectral profile. In a representative embodiment, if the filter efficiencies (% FE & %FE1988) are not fixed during optimization, and % LWE & % LWE1988 are optimized, then the overall efficiencies (% OE & % OE1988) should not be allowed to drop below 100%.

As was the case with FIG. 3, the efficiencies of FIG. 4 each may represent an optical index illustrated in, e.g., FIG. 1. Accordingly, one or more of these indices may be chosen for optimization to generate a customized spectral profile, which may then be used to generate a corresponding filter, lamp, or other illuminant.

FIG. 5 illustrates that a color rendering index and modified color rendering indices may be calculated as optical indices.

CRI may be calculated according to methods known in the art, e.g., using the method of CIE Publication 13.3-1995. A value of CRI=100 indicates that color rendering of a test source should be identical to color rendering of a reference source. Color rendering of greater than about 90 is normally adequate to judge sources reasonably equivalent in color rendering for most people. Color rendering less than 70 would normally suggest the test source to be inadequate for most observers in terms of meeting the same color rendering as the reference source. This criteria normally depends on little difference between the color temperature of the two sources, based on the limited von-Kries implementation of color adaptation. In some circumstances, one may utilize sources of different color temperatures. In this circumstance, one may rely on optimization to a better, optimal, or maximum CRI as the main optimization criteria.

CRI* may be calculated according to methods known in the art, e.g., using the method of CIE Publication 13.3-1995, except that the standard Munsell test samples of Publication 13.3-1995 are, in one embodiment, replaced by reflectance standards taken from the object to be illuminated, e.g., directly from a work of art (or object) or from an image of that art (or object). In one embodiment, reflectance data may be taken from a digital image of the object. One representative suitable method to achieve this is given in FIG. 9. Reflectance data may also be obtained from a camera suitable for measuring reflectance of one or more pixels of an image. In one embodiment, every pixel is measured. Using such a camera, the reflectance characteristics of an object can be exactly characterized sufficient to render an exact trial spectrum optimized to the object represented by the image data.

When one replaces standard Munsell test samples with reflectance standards taken from the object to be illuminated (or from an image or digital representation of that object), individual Ri's based on the reflectance standards from the object (e.g., a work of art) may be weighted as necessary according to need. For example, one may enhance color rendering of one feature over another. Note that replacing the Munsell standards with that from the object (e.g., a work of art) is consistent with the recommendations of CIE Publication 13.3-1995. As with CRI, a value of CRI*=100 indicates that color rendering of the test source should be identical to color rendering of the reference source. Color rendering of greater than 90 is normally adequate to judge sources reasonably equivalent in color rendering for most people. Color rendering less than 70 would normally suggest the test source to be inadequate for most observers in terms of meeting the same color rendering as the reference source. This criteria normally depends on little difference between the color temperature of the two sources, based on the limited von-Kries implementation of color adaptation. In some circumstances, one may utilize sources of different color temperatures. In this circumstance, one may rely on optimization to a better, optimal, or maximum CRI* as the main optimization criteria.

CRI109, which is used in embodiments of this disclosure, may be calculated by modifying the standard CRI method of CIE Publication 13.3-1995. This modification involves changing the limited von-Kries implementation of adaptive color correction (ACC) to be based on CIE Publication 109.2-1995 Revision 2. This change in the ACC permits a more flexible use of illuminants and filtered illuminants. This flexibility may relieve some of the restriction to maintaining color temperature between trial spectrum and reference spectrum. Additionally, the use of ACC based on CIE Publication 109.2-1995 Revision 2 provides some flexibility in optimizing for a specific Lux (Lumens/meter$^2$) of illumination on the object to be illuminated from the light of a lamp or filtered SOURCE with the properties of the trial spectral profile. Further modifications of CRI with other adaptive color methodologies can offer similar enhancements.

CRI109*, in analogy to CRI* may be calculated by utilizing the ACC CIE Publication 109.2-1995 Revision 2 method to modify the color rendering calculation, but replacing the standard Munsell test samples with reflectance data taken directly from works of art or other objects to be illuminated.

By optimizing one or more of the color rendering indices of FIG. 5, it will be apparent that one may effectively build a filter, lamp, or other illuminant that renders only photometric light—transmits visible-light photons that significantly affect the visualization (e.g., light necessary for proper color rendering) while blocking photons unneeded for this task. Using the modified color rendering indices of FIG. 5, one may build such a filter or illuminant customized for a particular object, such as a work of art. Alternatively, one may correct the rendering of an object, such as a work of art. For instance, one may enhance one or more colors, correct for vision loss, correct for damaged or faded works of art, or correct for any other type of problem that would benefit from the filtering of the present disclosure.

Individual steps within method 500 of FIG. 5 are self-explanatory. In step 510, one uses CIE Publication 13.3-1995 to obtain the standard color rendering index, CRI. In step 512, one modifies adaptive color correction with CIE Publication 109.2-1995 Revision 2 to obtain a modified color rendering index: CRI109. Step 514 can follow steps 510 and uses actual object reflection spectra instead of Munsell test patches to obtain a modified color rendering index: CRI*. In step 516, one can modify adaptive color correction with CIE Publication 109.2-1995 Revision 2 to obtain a modified color rendering index: CRI109*. Steps 518 and 520 can follow step 510. In step 518, one modifies adaptive color correction with any arbitrary color theory to obtain a modified color rendering index: CRI_ADP. In step 520, one uses full image pixel reflection spectra instead of Munsell test patches to obtain a modified color rendering index: CRI_full. Steps 522 and 524 can follow from step 520. In step 522, one modifies adaptive color correction with any arbitrary adaptive color theory to obtain a modified color rendering index: CRI_ADP_full. In step 524, one modifies adaptive color correction with CIE Publication 109.2-1995 Revision 2 to obtain a modified color rendering index: CRI109_full.

As was the case with FIG. 4, the color rendering parameters of FIG. 5 each may represent an optical index illustrated in, e.g., FIG. 1. Accordingly, one or more of these indices may be chosen for optimization to generate a customized spectral profile, which may then be used to generate a corresponding filter, lamp, or other illuminant.

Figure 6:
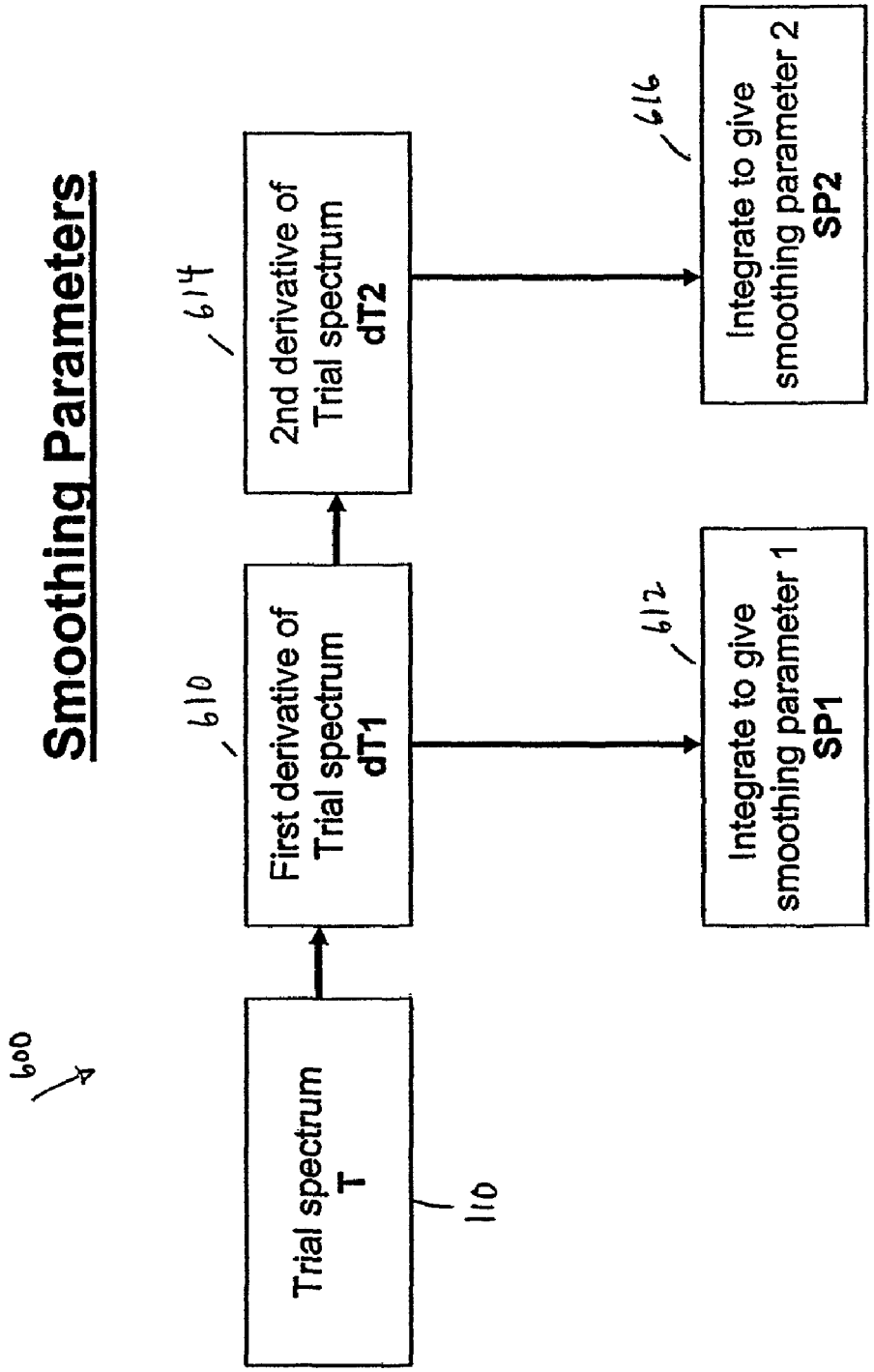
FIG. 6 is a schematic diagram of aspects of generating a customized spectral profile in accordance with embodiments of the present disclosure. Spectral smoothing criteria are calculated.

FIG. 6 shows example methodology 600 for the calculation of smoothing parameters when optimizing a trial spectrum. Smoothing reduces abrupt changes in a spectral profile, which reduces the occurrence of complications in calculating or designing a filter, lamp, or other type of illuminant from a trial spectral profile. The parameters illustrated in FIG. 6 are the sum of the first derivative changes (SP1) in the trial spectrum or the sum of the second derivative changes (SP2) in the trial spectrum. Minimizing either parameter has the effect of smoothing the trial spectrum. These parameters are example illustrations of the use of smoothing parameters and may be modified by those of ordinary skill in the art.

Trial spectrum 110 is obtained. In step 610, a first derivative is taken. In step 612, one integrates to obtain a first smoothing parameter, SP1. In step 614, a second derivative of trial spectrum 110 is taken. In step 616, one integrates to obtain a second smoothing parameter, SP2.

As was the case with FIGS. 4 and 5, the smoothing parameters of FIG. 6 each may represent an optical index illustrated in, e.g., FIG. 1. Accordingly, one or more of these indices may be chosen for optimization to generate a customized spectral profile, which may then be used to generate a corresponding filter, lamp, or other illuminant.

Figure 7:
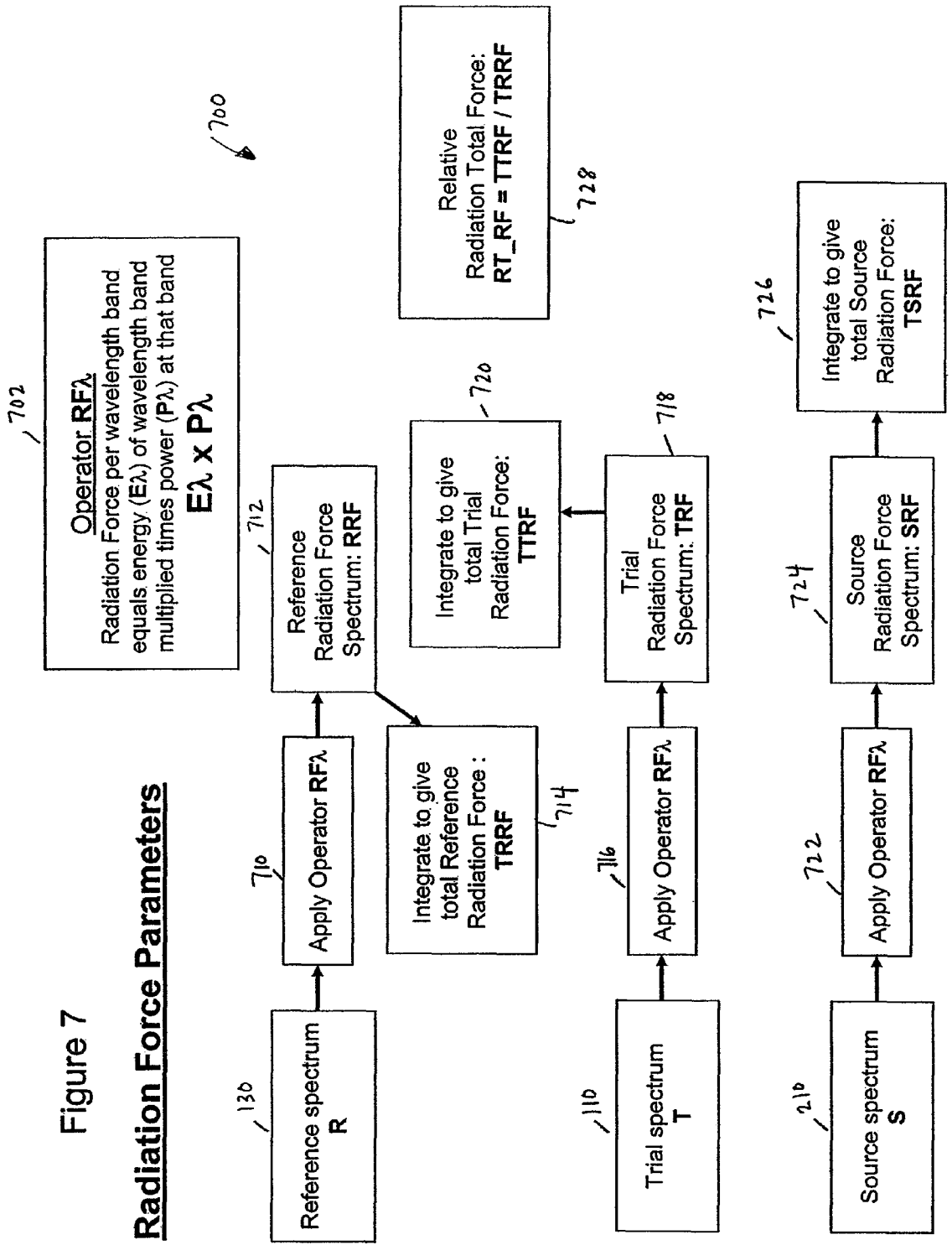
FIG. 7 is a schematic diagram of aspects of generating a customized spectral profile in accordance with embodiments of the present disclosure. Radiation Force parameters are calculated.

FIG. 7 shows example methodology 700 for the calculation of several different radiation force parameters. The radiation force parameter for a wavelength band may calculated by multiplying some mathematical exponential-power n of the energy (E$\lambda$ as indicated in FIG. 7) of that band times the radiometric power of the band. In FIG. 7, n is set to unity for example purposes only (n=unity; (E$\lambda^1$)). This translates into just multiplying the energy times the radiometric power. When n=1, the parameter has the units of force, and hence the general description of this parameter as "radiation force," though this descriptor is retained when n is not equal to unity (1). Minimizing this property or the spectral integration of this property minimizes the contribution of higher energy photons to the trial spectral profile. In order to assure minimization relative to a reference spectrum, one can also define a relative total radiation force parameter RT_RF. Note that the effect of changing n is to adjust the relative sensitivity of radiation force parameters to the energy.

Individual steps within method 700 of FIG. 7 are self-explanatory. Method 700 gives rise to several different radiation force parameters that can be used for trial spectrum optimization for the generation of customized profiles. Step 702 defines and explains the operation of the RF$\lambda$ operator (the "Operator"). In step 710, the Operator is applied to the reference spectrum 130. In step 712, the reference radiation force spectrum RRF is obtained. In step 714, one integrates to give a total reference radiation force: TRRF. In step 716, the Operator is applied to the trial spectrum 110. In step 718, the trial radiation force spectrum TRF is obtained. In step 720, one integrates to give a total trial radiation force: TTRF. In step 722, the Operator is applied to the SOURCE spectrum 210. In step 724, the SOURCE radiation force spectrum SRF is obtained. In step 726, one integrates to give a total SOURCE radiation force: TSRF.

As was the case with FIGS. 4-6, the radiation force parameters of FIG. 7 each may represent an optical index illustrated in, e.g., FIG. 1. Accordingly, one or more of these indices may be chosen for optimization to generate a customized spectral profile, which may then be used to generate a corresponding filter, lamp, or other illuminant.

FIG. 8 shows example methodology 800 for calculating the power, standard photopic function luminosity (based on the standard V$\lambda$) and the 1988 CIE Publication #86 modified phototopic function luminosity of a SOURCE spectrum 210, a trial spectrum 110, and a reference spectrum 130. Individual steps within method 800 of FIG. 7 are noted within the figure and are self-explanatory.

Note that the parameters of FIG. 8 may represent optical indices illustrated in, e.g., FIG. 1. Accordingly, one or more of them may be chosen for optimization to generate a customized spectral profile, which may then be used to generate a corresponding filter, lamp, or other illuminant. These parameters may also represent foundation parameters for other parameters as they do in an example fashion for the parameters illustrated in FIG. 4. As here, all parameters shown in FIGS. 2-8 may represent foundation parameters to derive other indices as illustrated in FIG. 1 or FIG. 1A.

Figure 9:
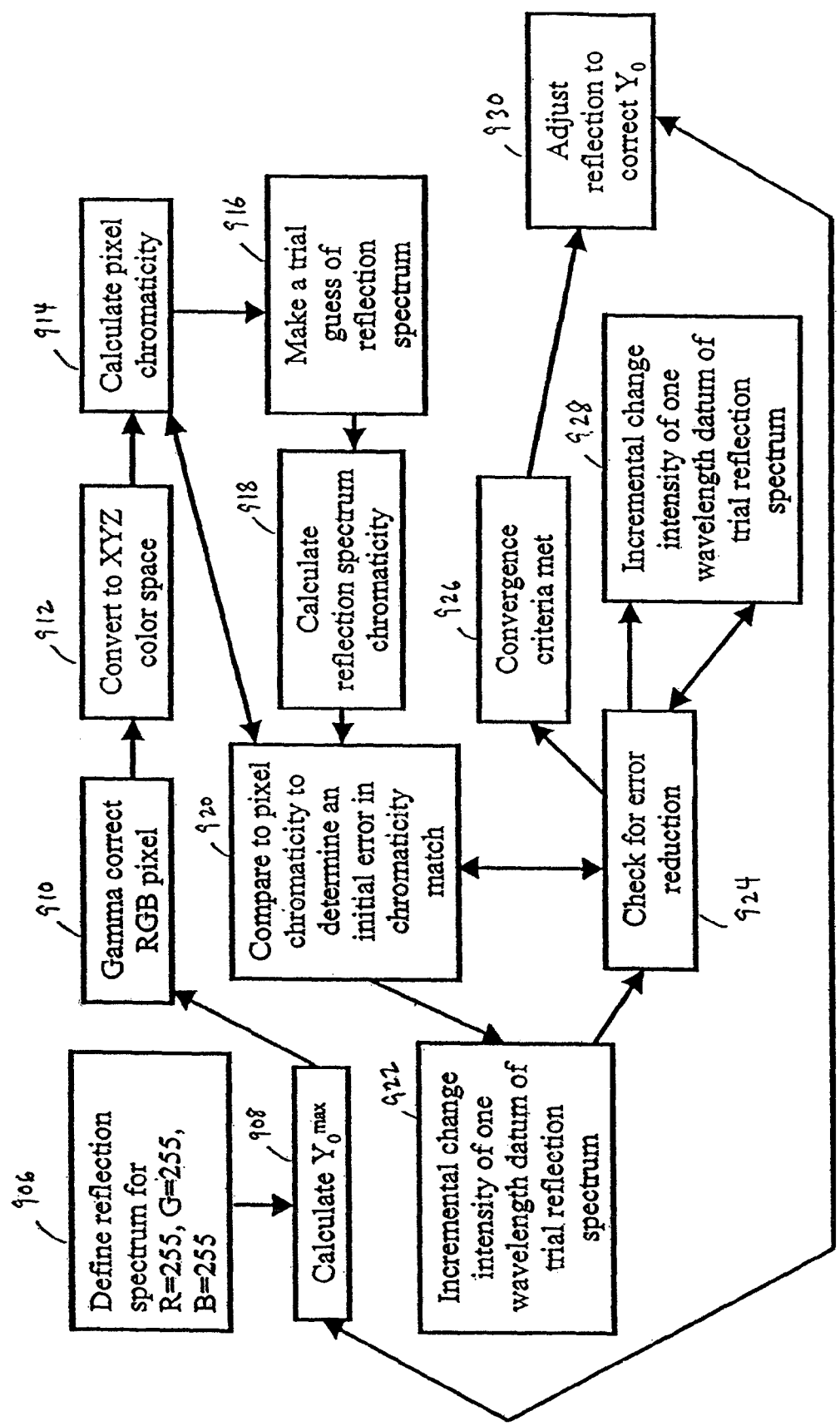
FIG. 9 is a schematic diagram of aspects of generating a customized spectral profile in accordance with embodiments of the present disclosure. A technique for calculating reflection information from a bitmap file is provided.

In FIG. 9, a technique to calculate reflection data from a bitmap file is presented. This technique permits rapid estimation of reflection data for regions of a work of art from a 24 bit true color bitmap image. This could be done when reflectance data of the image is not readily available by other means. The steps of FIG. 9 are self-explanatory, illustrating how pixel chromaticity may be compared to reflection spectrum chromaticity, and an incremental change may be made to a trial reflection spectrum until an error-reduction convergence criteria is met. Having the benefit of the present disclosure, those of ordinary skill in the art will recognize that other techniques may be used to extract appropriate reflectance data from a digital representation of an object to be illuminated.

FIG. 10 and FIG. 10A show two different filter profiles with different radiation force optimizations, as an example of the use of the parameters specified in FIG. 7. FIG. 10 is the data of the optimization of a filter to 50% power reduction (leaving luminosity=100% of the reference with all relevant CRI parameters>99) with no application of a radiation force parameter. FIG. 10A is the data of the optimization of a filter to 50% power reduction (leaving luminosity=100% of the reference with all relevant CRI parameters>99) after applying a radiation force parameter and minimizing that parameter. It can be seen that the excess radiation force above the reference spectrum is lower than in FIGS. 10 and 10A. This, in turn, can help ensure that the object being illuminated is subject to less energetic, and potentially harmful, light irradiation.

Figure 11:
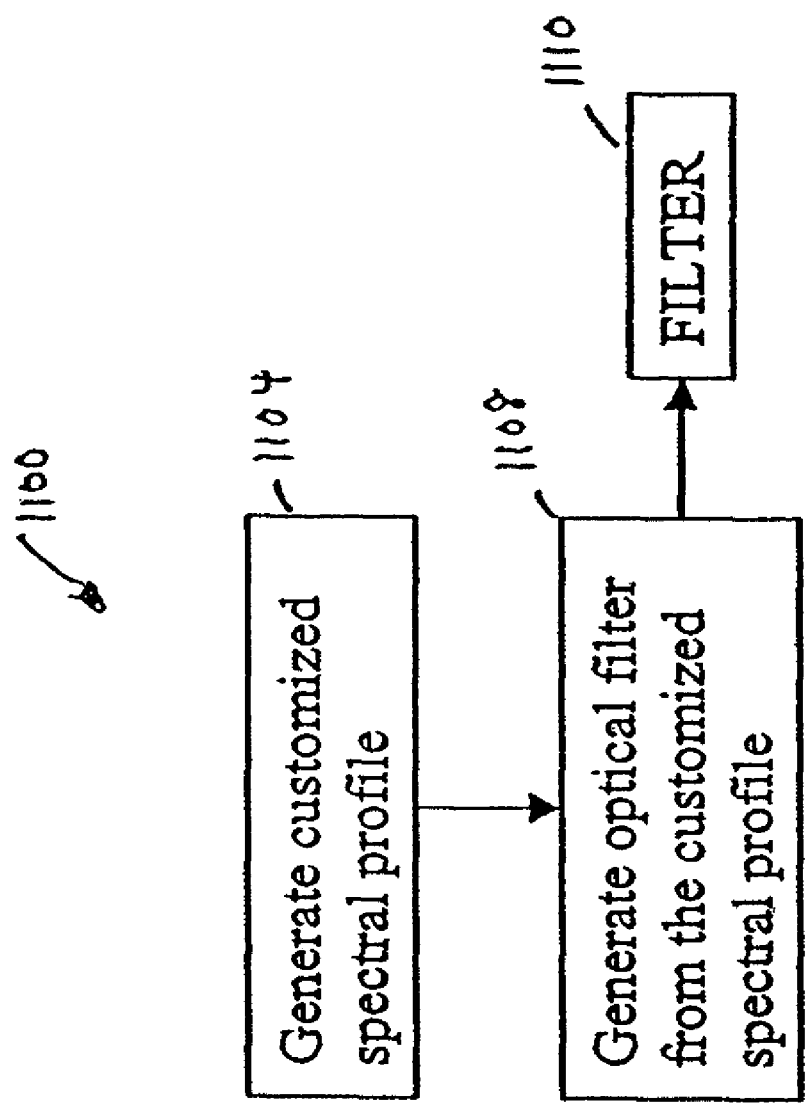
FIG. 11 is a schematic diagram showing the creation of a corresponding filter from a customized spectral profile in accordance with embodiments of the present disclosure.

FIG. 11 is a schematic diagram showing the creation of a corresponding filter from a customized spectral profile in accordance with embodiments of the present disclosure. This figure is included to illustrate what has been mentioned throughout this disclosure: once a customized spectral profile is created, one may create a corresponding filter. In other embodiments, one can create a lamp or other illuminant using the spectral profile using techniques known in the art. Methodology 1100 includes steps 1104 and 1108 to create filter 1110. In step 1104, a customized spectral profile is created using any of the steps disclosed herein with respect to trial spectrum 110, e.g., FIG. 1. In step 1108, a filter 1110 is created. This step may entail any of many known manufacturing techniques in which a custom profile is realized in the form of a filter, such as but not limited to, dielectric filters.

Figure 12:
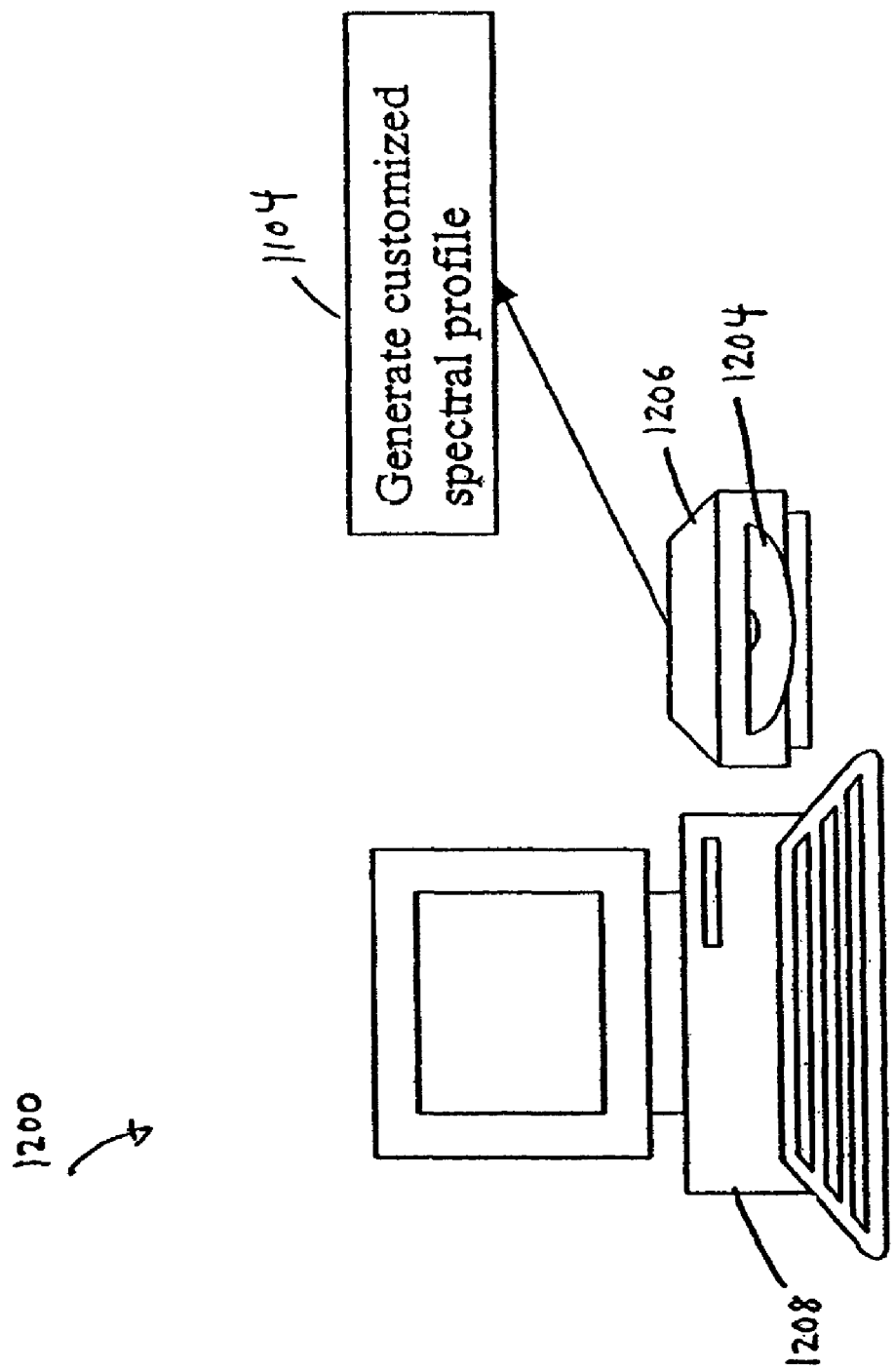
FIG. 12 is a schematic diagram showing a computer readable media programmed with instructions for generating a customized spectral profile in accordance with embodiments of the present disclosure.

FIG. 12 is a schematic diagram showing a computer readable media programmed with instructions for generating a customized spectral profile in accordance with embodiments of the present disclosure. System 1200 includes a computer 1208 and a CD ROM drive 1206. In one embodiment, instructions for generating a customized spectral profile 1104 may be placed onto CD 1204 for execution by computer 1208. Those of ordinary skill in the art will recognize that the instructions may be placed, instead, on the hard drive of computer 1208, on a different removable type of memory, in RAM, or in any other form as long as computer 1208 (or another computing device) can carry out the instructions. The instructions themselves may be coded using any computer language suitable for translating the steps of this disclosure into computer code. In one embodiment, C++ may be used. In another embodiment, the steps may be incorporated into a spreadsheet, such as the MICROSOFT EXCEL spreadsheet program. In such an embodiment, the solver 114 may correspond to the SOLVER functionality of that software.

The following examples are included to demonstrate specific, non-limiting embodiments of this disclosure. It should be appreciated by those of skill in the art that the techniques disclosed in the examples that follow represent techniques discovered to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention. For example, while examples may be directed to filters, one may apply the same techniques in designing lamps or other illuminants (e.g., without filters) using the same techniques—the lamp or other illuminant is manufactured based on the finalized trial spectrum (the customized profile).

Issues to embodiments of this disclosure include the ability to optimize a filter designed specific for a particular light source. In applications of museum light filtration, the main light sources are MR QTH incandescent sources with color temperatures typically from 2900K to 3400K. One normally will design a filter for a source of a given color temperature. However, in this disclosure, one is not restricted to filtering non-incandescent sources or sources of color temperatures only within this range.

Once a lamp source is determined, one may define what one wants to achieve. There are at least nine representative variables or goals one can optimize toward.
1. Color rendering index
2. Filter efficiency
3. Luminance/watt efficiency
4. Overall efficiency
5. Color temperature or chromaticity of filtered light
6. Modified color rendering indices as described here-in
7. Power reduction on object
8. Radiation Force
9. Profile smoothing One embodiment of the invention involves being able to solve for a filter, lamp, or other illuminant that is optimized for one or more of these features. As an example, we show a filter that will take a 3000K incandescent source and render the minimum amount of non-photopic light. In other words, this filter minimizes light which doesn't contribute to vision. In radiometric and photometric language, non-photometric radiometric light is minimized while otherwise maintaining the color rendering and/or color temperature, and/or filter efficiency, and/or overall efficiency.

Figure 13:
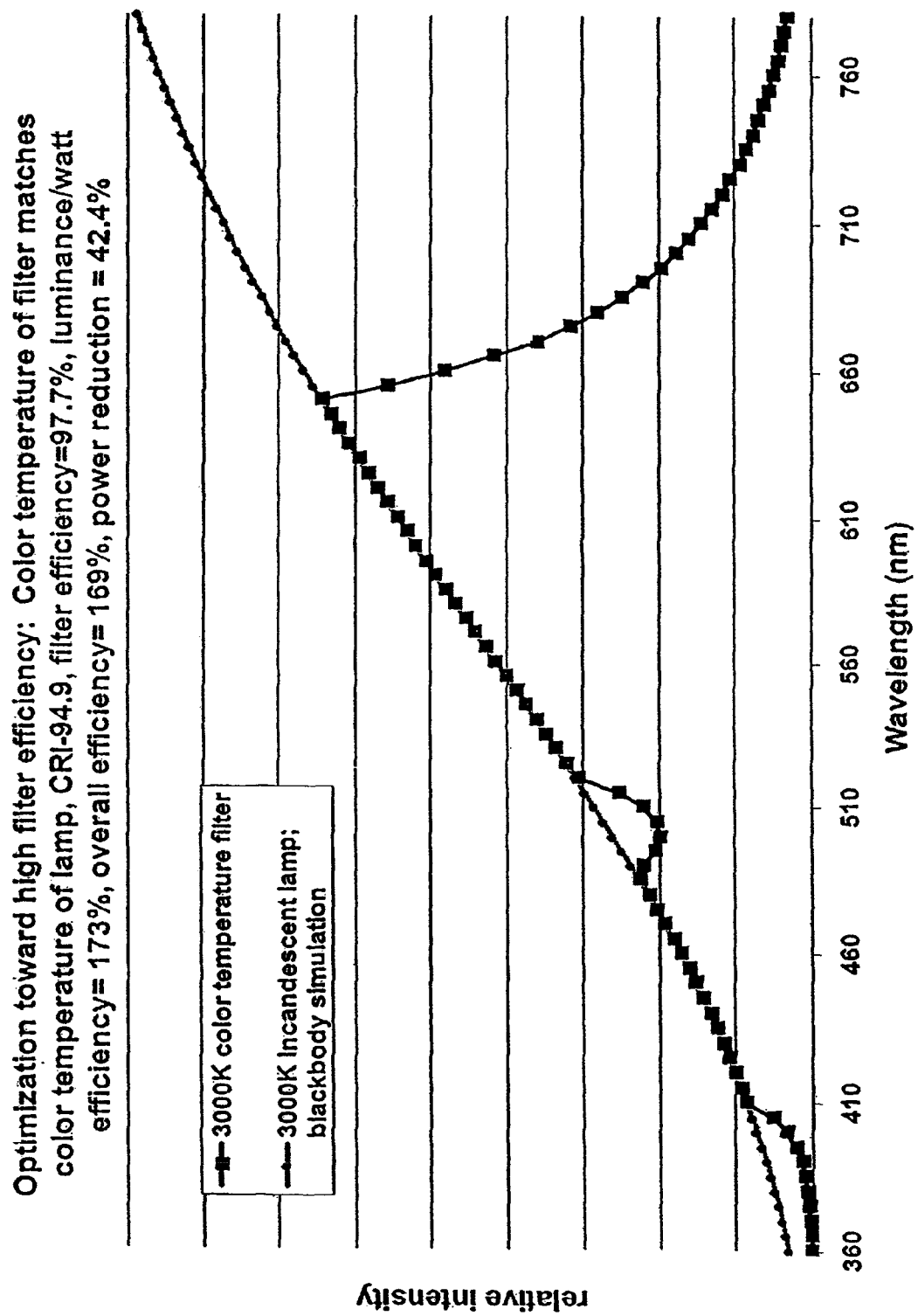
FIGS. 13-22 illustrate representative customized spectral profiles for filter designs in accordance with embodiments of the present disclosure.

FIG. 13 is an example filter for a 3000K (Q)TH source that renders only photometric light. Note that the CRI of 94.9 is slightly lower than the 100 of the original source, but may be made higher in similar designs. However, a CRI this high is probably indistinguishable for the average viewer, if not most viewers. The filter efficiency is generally how effectively visible light is transmitted. One typically wants that as high as possible so there is no need to increase the lamp output. The illustrated filter requires no increase in lamp output. The luminance/watt efficiency is generally a measure of the relative efficiency of the lamp with and without the filter of converting radiometric watts into photometric lumens. If the luminance/watt efficiency were less than 100%, the filter would be doing a poorer job at providing lumens for the radiometric watts of light emitted. The illustrated filter is quite good at this: 173%. The overall efficiency takes into account that one might have a poor filter efficiency, but a terrific luminance efficiency. As long as this number is above 100%, the filter is potentially useful given other characteristics are satisfactory. Generally, this filter preserves the color temperature, preserves color rendering, and significantly reduces unnecessary radiometric watts.

Figure 14:
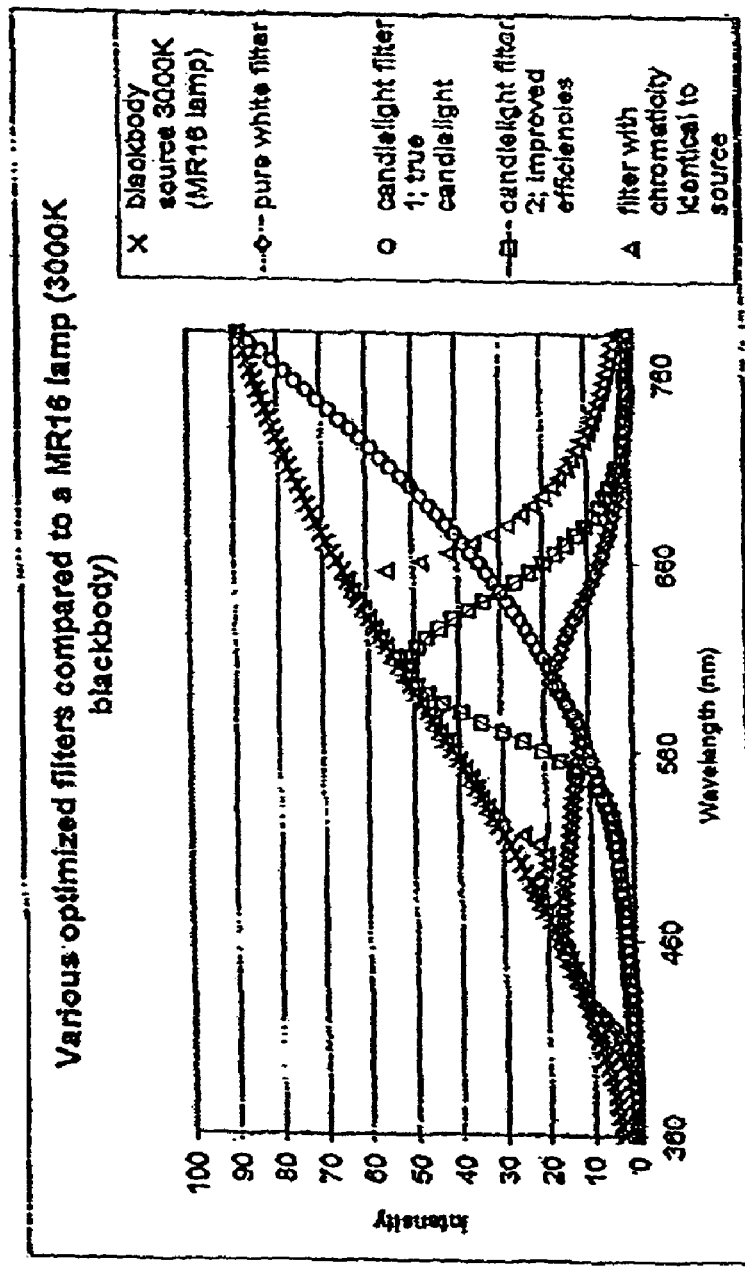
Figure 15:
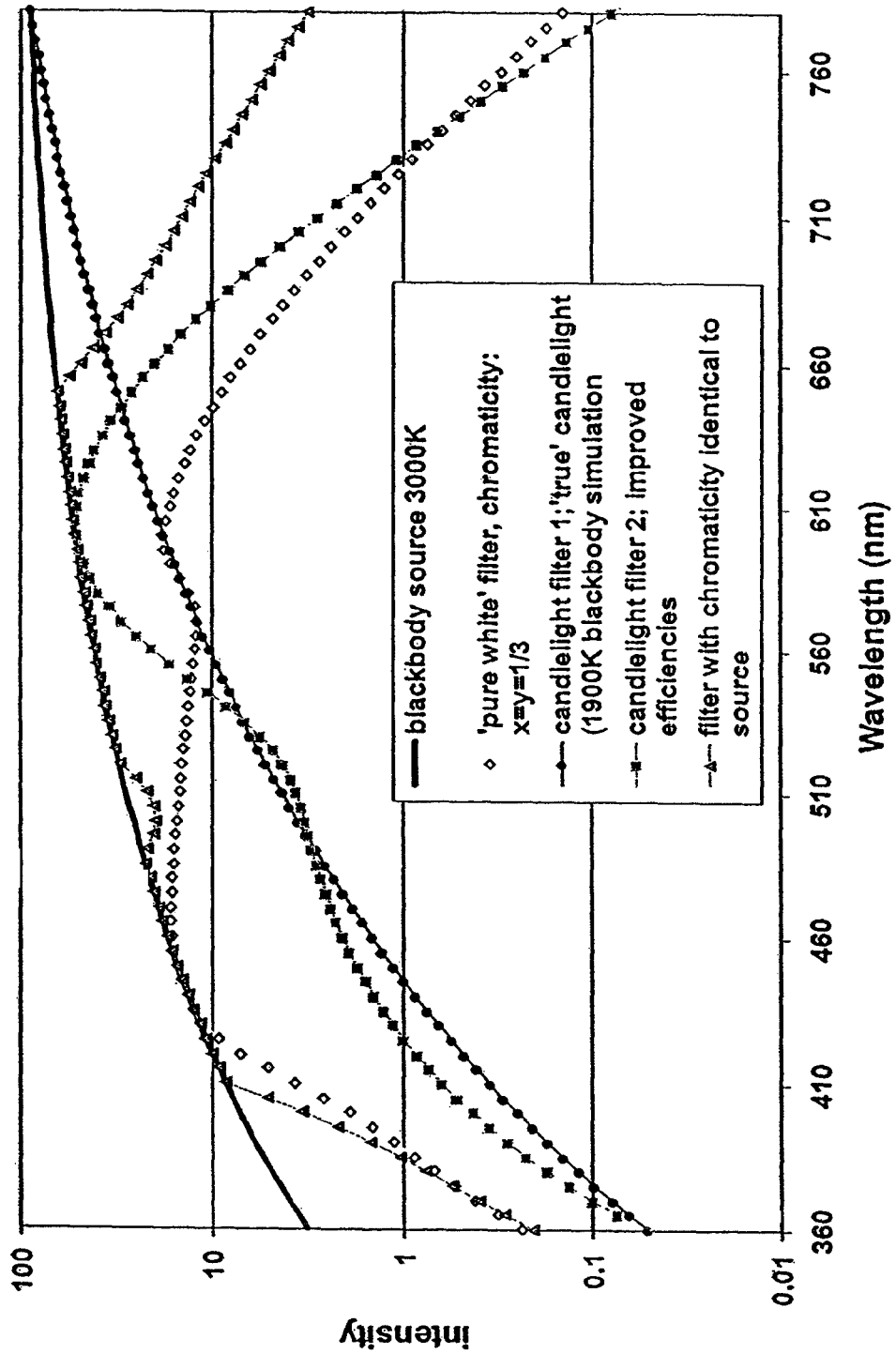
Figure 16:
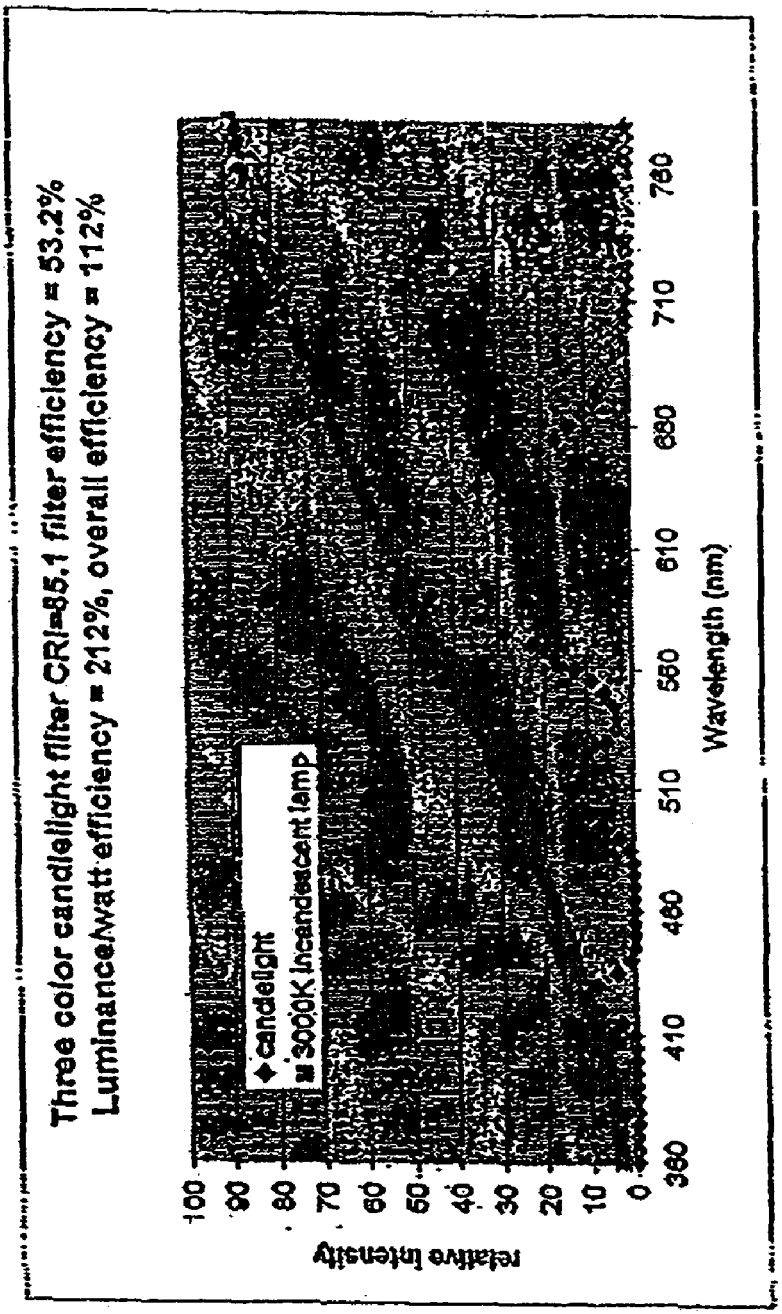

The next set of figures, FIGS. 14-16, illustrates characteristics of FIG. 13 as well as some candlelight filter options. Candlelight is a potentially desirable form of illumination for at least two reasons:
a) Most artwork was created under candle/lamp light prior to the invention of the gas mantle lamp in the 1830s.
b) Candlelight minimizes higher energy photons that would produce the most photochemical damage.

FIGS. 14-16 provided illustrate (normal plot, and log) the original 3000K source, the filter showed at the beginning of this example section, "true" candlelight, a pure white filter, and an average candlelight filter. One important thing to note is that at the blue, low-wavelength end, the intensity of the light for candlelight drops well below the original source or the non-candlelight filters. This is very important to recognize because it implies that true candlelight or a filter that renders candlelight significantly attenuates the most damaging high energy photons.

What follows below in Table 1 are representative data for those filters.

TABLE 1

| Light sources | 1931 CIE Chromaticity x | 1931 CIE Chromaticity y | Filter efficiency (transmitted visible light; relative to 3000K source) | Lumens/watt efficiency (relative to 3000K source) | CRI—Color rendering index (reference is 3000K blackbody lamp) |
|---|---|---|---|---|---|
| Blackbody source; 3000K MR16 lamp | 0.4369 | 0.4041 | 100 | 100% | 100 |
| Pure white filter | 0.3333 | 0.3333 | 31.5% | 172.6% | 58.7 |
| Candlelight filter 1; true candlelight | 0.5378 | 0.4112 | 28.2% | 53.0% | 54.7 |
| Candlelight filter 2; improved efficiencies | 0.5378 | 0.4112 | 59.9% | 225% | 64.3 |
| Filter with chromaticity identical to source | 0.4369 | 0.4041 | 97.7% | 172.8% | 94.7 |

As apparent from Table 1, one may not want a pure white light because it has relatively poor color rendering and its overall efficiency (52%; multiply the other two numbers to get this) is less than 100%, and CRI is not great.

"True" candlelight may, in some circumstances, not be worth trying to create by filtering since it generally has a terrible overall efficiency, and color rendering is not great.

One may dramatically improve the candlelight filter (candlelight filter #2) in terms of efficiency, but color rendering is still not great, but may be acceptable for many viewers.

In FIG. 16, an improved candlelight filter is illustrated. This filter is representative of the improvements that can be made. Using the techniques of this disclosure, even further improvements and modifications can be readily made.

The filter of FIG. 16 offers the candlelight advantages as well as a modest reduction in total non-luminous photons. The real advantage is the reduction in high energy photons. Note that up to 410 nm, light transmission is essentially zero. Note the CRI of 85. This filter is a candidate candlelight filter that may keep museum patrons happy, but better protect works of art.

Figure 17:
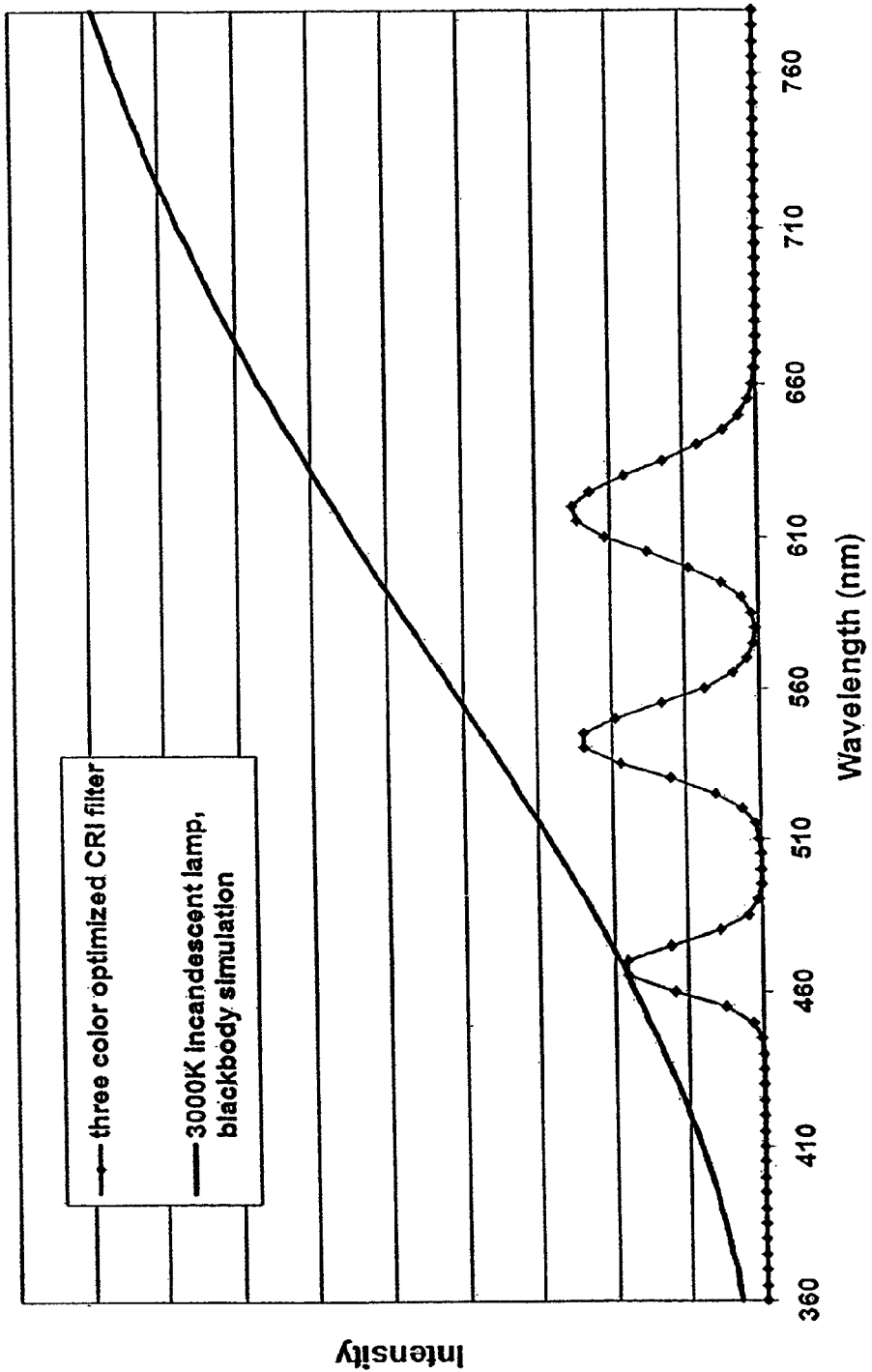

FIG. 17 illustrates a different three color filter, whose characteristics are provided on the plot.

FIGS. 18-22 illustrate different spectral profiles customized to the particular object being illuminated—here, the objects are works of art.

Figure 18:
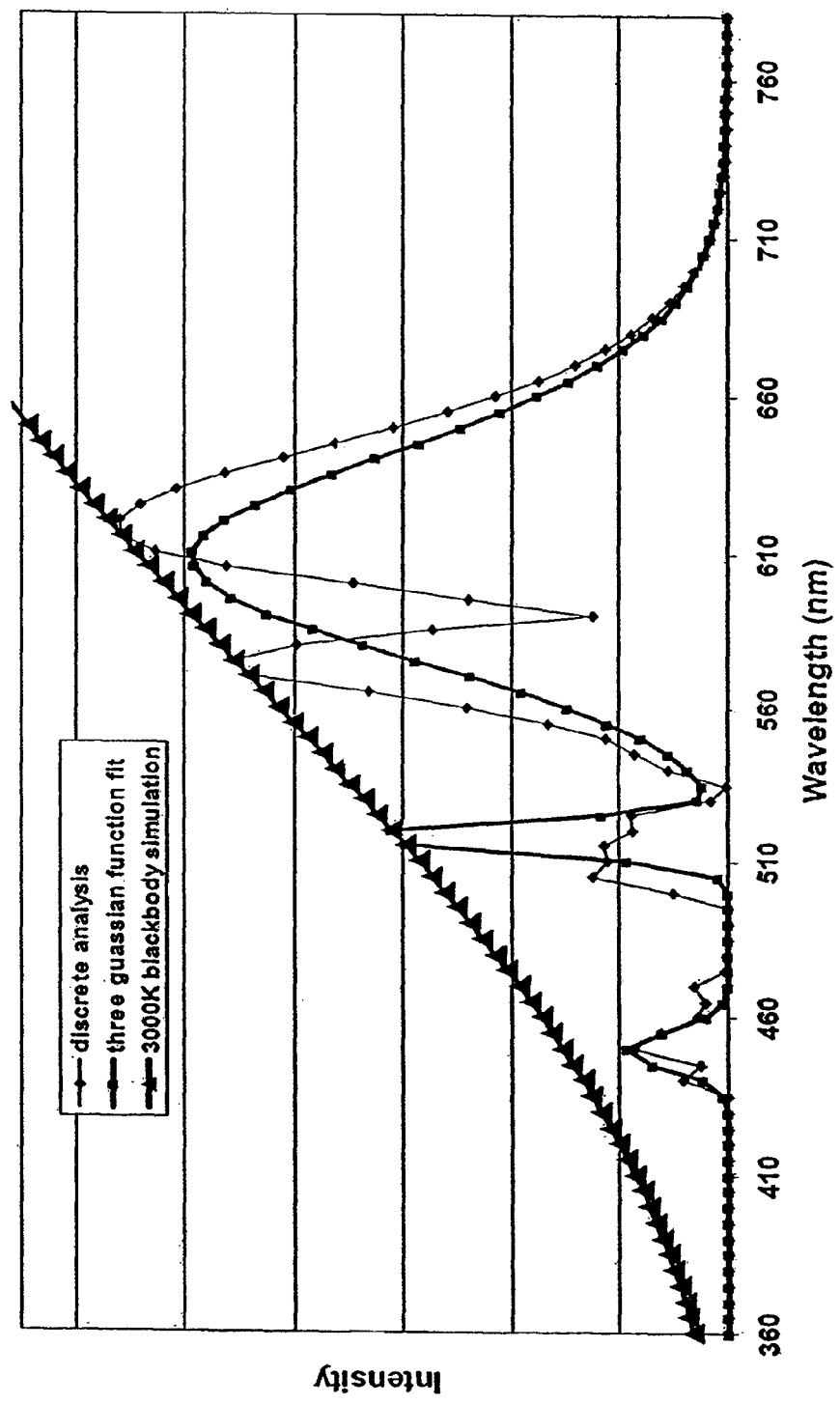

FIG. 18 is a comparison of two spectral profiles for filters for Claude Monet's La vu du jardin aux Roses, Musee Marmottan, Paris. This painting was done with Monet's left eye that retained a cataract. These two filters illustrate either using 3 Gaussian functions to best fit for color rendering or by discretely optimizing any point to achieve a best fit. The parameters for this optimization are given below in Table 2: :

TABLE 2

|  | Discrete | 3-Gaussian |
|---|---|---|
| CRI | 71.1 | 81.1 |
| CRI* | 93.8 | 83.9 |
| Efficiency | 54% | 52% |
| L/W Efficiency | 203% | 210% |
| Overall Efficiency | 110% | 110% |
| Power Reduction | 73% | 75% |

Note that CRI is the standard CIE color rendering index. CRI*, in contrast, can rely on reflection spectral data from an image of the painting. By optimizing on actual reflection data from the painting, one may optimize the filters directly to painting features, rather than the arbitrary reflection standards in the normal CIR CRI definition.

Figure 19:
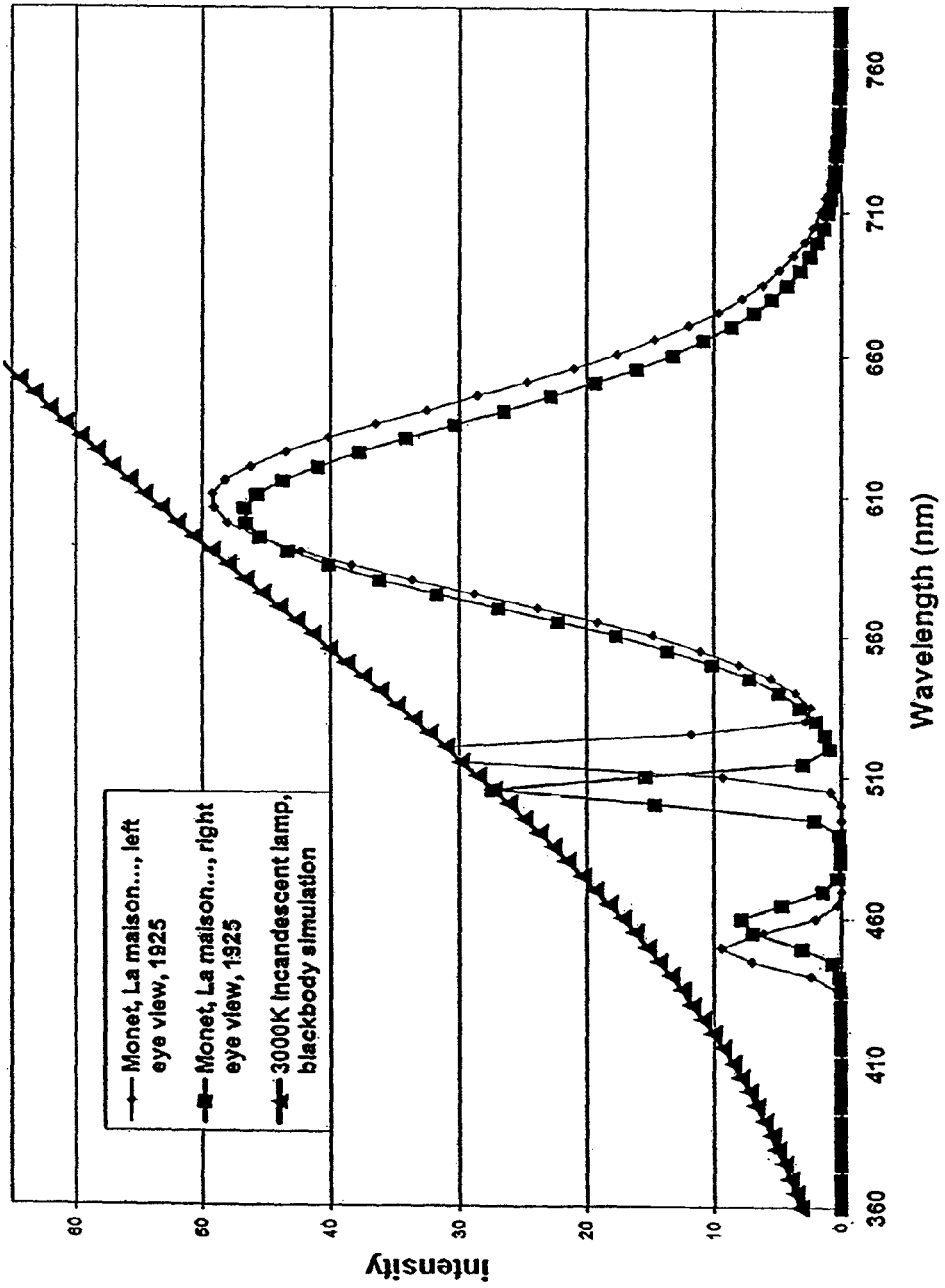

In FIG. 19, two different candlelight filters are shown, each being customized to a particular work of art. The two spectral profiles each represent a filter for a particular Monet Painting. The two paintings are the left and right eye view of Monet's La Maison vue du jardin aux Roses. Recall that these two views are separately through an eye with a cataract and an eye with a cataract removed, in 1925. The left-eye view is heavily orange in color, while the right-eye view, absent the cataract, is blue and green in color. These two filters illustrate the level of control the technique provides in optimizing filters for a given work of art.

Each filter was optimized using 3 Gaussian functions. Parameters for the fits are listed in Table 3:

TABLE 3

|  | Right Eye | Left Eye |
|---|---|---|
| CRI | 74.1 | 81.1 |
| CRI* | 87.4 | 83.9 |
| Efficiency | 50.1% | 52% |
| L/W Efficiency | 219% | 210% |
| Overall Efficiency | 110% | 110% |
| Power Reduction | 77% | 75% |

Note that each spectral profile was optimized to CRI*, the color rendering index that can be based on actual reflection data from the paintings themselves. For the example of FIG. 18, the inventor used a procedure to obtain reflection data from images of the paintings (see FIG. 9B).

Figure 20:
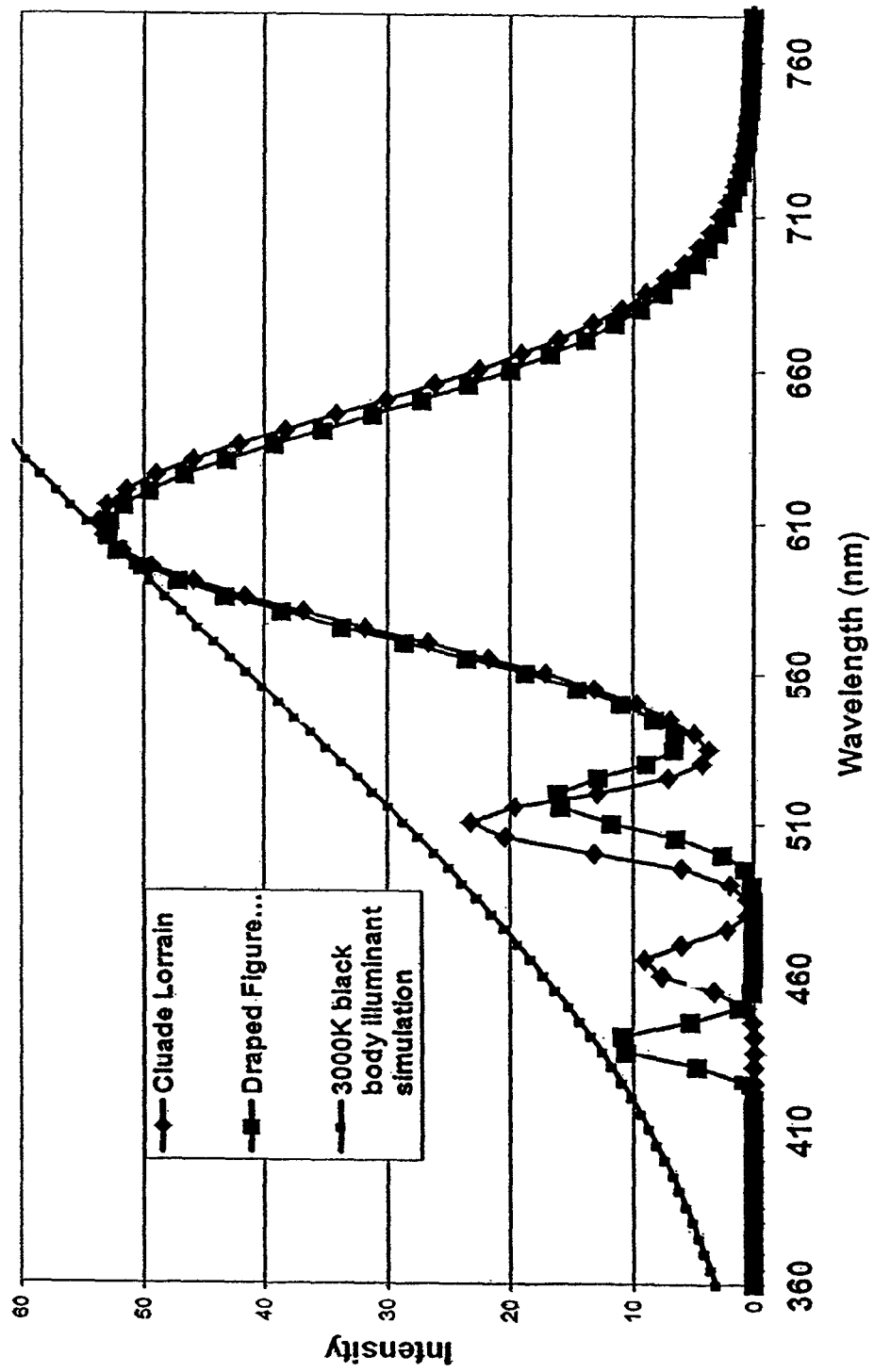

FIG. 20 is a comparison of filters for two Getty Museum watercolors, The Draped Figure Holding A Book and Claude Lorrain's Coast Scene with a Fight on a Boat. The Draped Figure is in green colors, while the Coast Scene is done on blue paper so that blue tones dominate. Note that the filters have been optimized toward CRI* so that reflection data from each work was used to optimize to best color rendering.

Fitting data for both is listed in Table 4:

TABLE 4

|  | Claude Lorrain | Draped Figure |
| --- | --- | --- |
| CRI | 75.2 | 75.2 |
| CRI* | 87.3 | 99.9 |
| Efficiency | 58% | 58% |
| L/W Efficiency | 210% | 210% |
| Overall Efficiency | 122% | 122% |
| Power Reduction | 72% | 72% |

Figure 21:
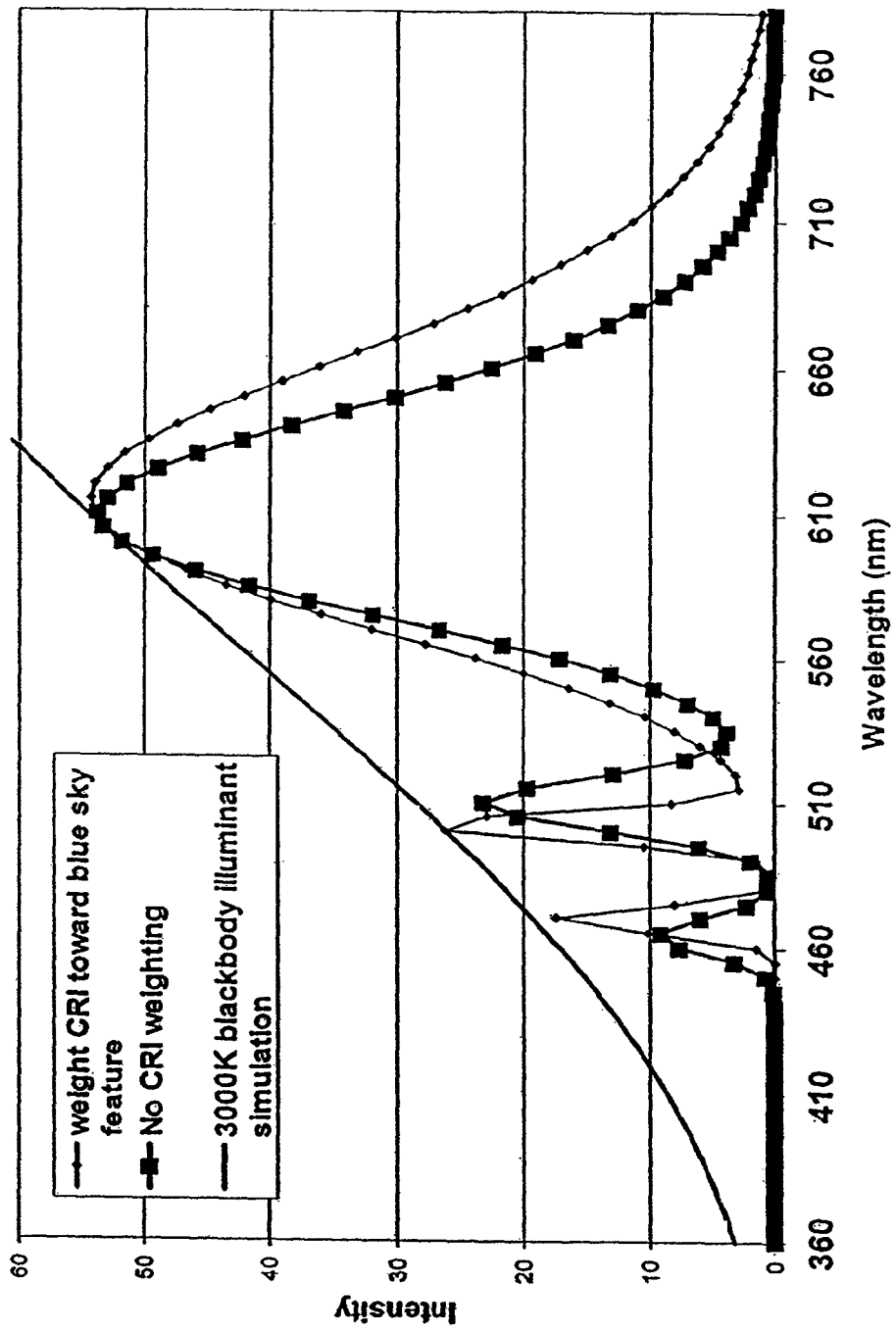

Note that it may well turn out that perhaps blue rendering might be inadequate for many patrons using this filter. Using the techniques of this disclosure, however, it is possible to weight the filter primarily toward the blue features of Clause Lorrain's Coast Scene to enhance the blue, as desired:

In this regard, FIG. 21 is a comparison of weighted and unweighted CRI optimizations of the blue sky feature of Claude Lorrain's Coast Scene with a Fight on a Boat. Note that optimizing toward the blue sky feature results in a different filter spectral profile. This figure illustrates, among other things, that filters may be customized even to areas or particular features within a particular object.

Comparison of the fit data is listed in Table 5:

TABLE 5

|  | No CRI weighting | CRI weighting |
| --- | --- | --- |
| CRI | 75.2 | 74.4 |
| CRI* | 87.3 | 96.2 |
| Efficiency | 58% | 64% |
| L/W Efficiency | 210% | 173% |
| Overall Efficiency | 122% | 110% |
| Power Reduction | 72% | 63% |

Figure 22:
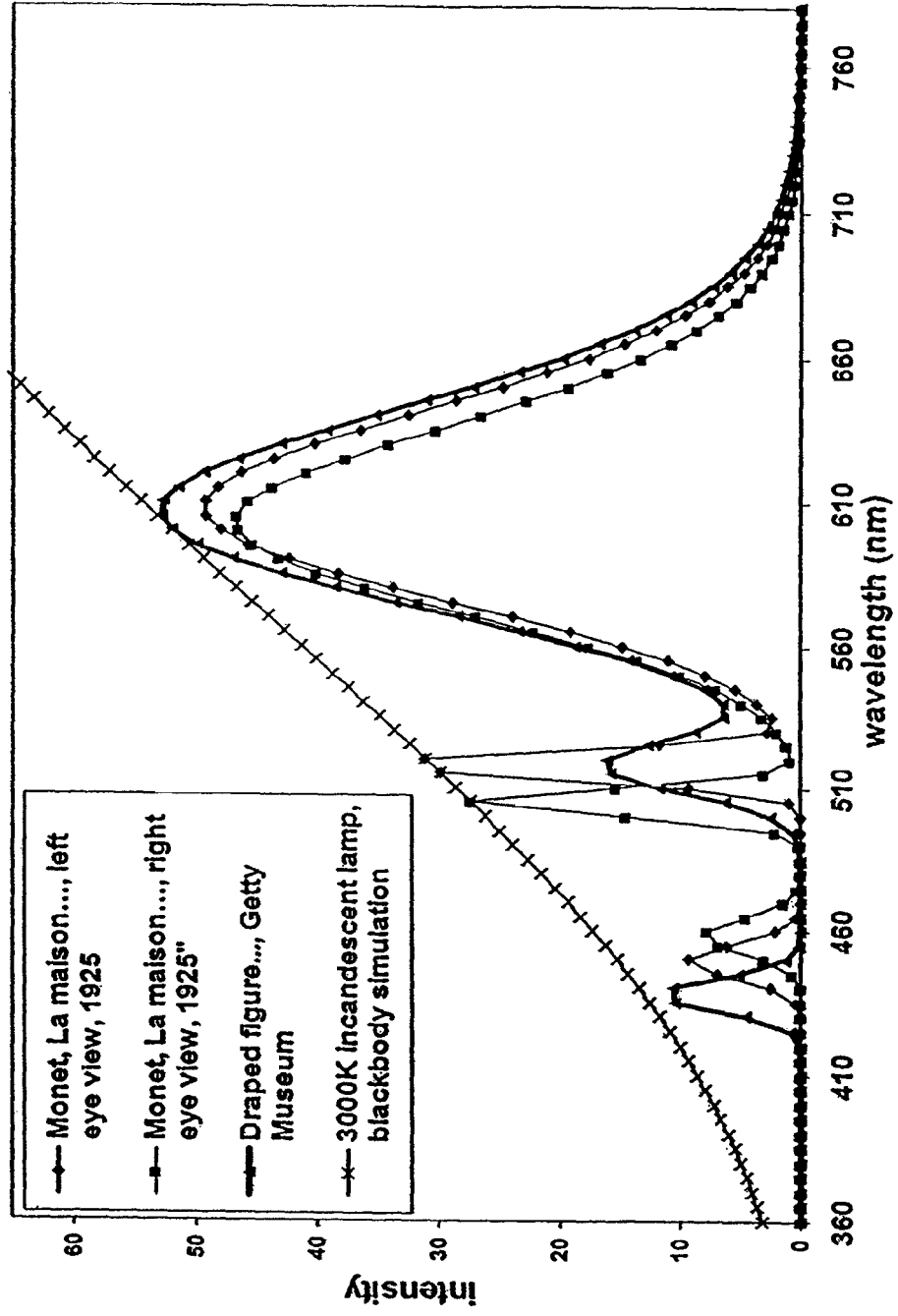

FIG. 22 shows three filters. Two Monet filters, and the filter for The Getty Museum watercolor, A Draped Figure Holding a Book. The filters are optimized using three Gaussian functions use reflection data from images of the paintings to optimize to a modified color rendering index, CRI*, tailored to each painting. As in previous candlelight filters, the spectral power distribution is held (by way of fixing the chromaticity) at that comparable to what would be expected from candlelight; hence, these are "candlelight" filters. The fact that the three filters are different illustrates the advantages in being able to optimize a filter to a given painting.

The parameters for these fits are listed in Table 6:

TABLE 6

|  | Monet Right Eye | Monet Left Eye | Draped Figure |
| --- | --- | --- | --- |
| CRI | 74.1 | 81.1 | 75.2 |
| CRI* | 87.4 | 83.9 | 99.9 |
| Efficiency | 50.1% | 52% | 58% |
| L/W Efficiency | 219% | 210% | 210% |
| Overall Efficiency | 110% | 110% | 122% |
| Power Reduction | 77% | 75% | 72% |

Note that CRI* is nearly 100 for the Draped Figure artwork, suggesting that this spectral profile would likely do a very good job at rendering this object—in fact, about well as the reference 3000K blackbody source being used.

What these examples emphasize, among other things, is that if the CRI* index is used as optimization parameters for the methodology of the present disclosure, one may readily generate customized spectral profiles (and filters) for particular works of art or objects. By weighting the CRI* optimizations differently (e.g., towards one or more features of the work of art, towards one or more features to be enhanced or emphasized, towards one or more damaged or faded features, towards one or more features to be de-emphasized or muted), one may further customize the spectral profiles and filters. Accordingly, one may render objects aesthetically and/or correct the rendering of objects. Because of the flexibility of the techniques of the present disclosure, any degree of customization is achievable simply by changing optimization parameters.

With regard to filter design, a lot may depend on setting priorities, and this is something that is typically discussed with museum conservators and involves getting the opinions of others. In particular, it may involve discussing high energy photons versus reducing all unnecessary photons. Intuition suggests that the high energy photons may be the main concern, but again, with the flexibility of the techniques herein, any number of different goals may be achieved, ranging from (but not limited to) generic filter to filters customized to particular works of arts.

With the benefit of the present disclosure, those of ordinary skill in the art will recognize that the techniques of this disclosure can be applied to, e.g., a vast number of lighting applications. For instance, in one embodiment, one can use these techniques and directly thin-film coat a light-emitting diode (LED) to modify the profile of the LED. LEDs have fairly-narrow spectral profiles confined to the visible. There is little infrared (IR) radiation, or the light is "cold." One can design an illuminant where the spectral profile of a broad band white LED is coated with an interference filter or use three different LEDs (blue, green, red) and selectively coat each so that the combined light from the LEDs is tailored as desired. An advantage to using LED illumination is that the IR is already mostly or completely removed, the emission is already confined to the visible, and power consumption is much lower.

With the benefit of the present disclosure, those having skill in the art will comprehend that techniques claimed herein and described above may be modified and applied to a number of additional, different applications, achieving the same or a similar result. The claims attached hereto cover all such modifications that fall within the scope and spirit of this disclosure.

The invention claimed is:

1. A method for generating a customized spectral profile, comprising:
   generating a trial spectrum;
   obtaining a reference spectrum;
   calculating one or more optical indices of the trial spectrum from measured spectral data of an object;
   calculating one or more corresponding optical indices of the reference spectrum; and
   varying the trial spectrum with a computer to optimize the one or more optical indices of the trial spectrum with respect to the one or more corresponding optical indices of the reference spectrum to generate the customized spectral profile.

2. The method of claim 1, the measured spectral data comprising data from an image of the object.

3. The method of claim 1, the measured spectral data comprising reflectance spectra of an object.

4. The method of claim 3, the measured spectral data comprising reflectance spectra from a plurality of pixels of a digital representation of the object.

5. The method of claim 1, the optical indices comprising one or more of chromaticity, filter efficiency, lumens per watt efficiency, overall filter efficiency, watt reduction criteria, radiation force, profile smoothing, color rendering index, and modified color rendering index.

6. The method of claim 5, one or more of the optical indices corresponding to a specific object to be illuminated.

7. The method of claim 6, the specific object comprising a work of art.

8. The method of claim 1, the varying comprising varying the trial spectrum by changing one or more parameters of contributing functions of the trial spectrum or changing individual values of the trial spectrum at different wavelengths.

9. The method of claim 1, the spectral profile rendering only photometric light, or tailored regions of photometric light.

10. The method of claim 1, the spectral profile comprising a spectral profile for aesthetically rendering an object.

11. The method of claim 10, the spectral profile being selected from the group consisting of a candlelight profile, a torchlight profile, a fluorescent profile, an incandescent profile, a halogen profile, an oil lamp profile, a daylight profile, a roomlight profile, a gas light, a lime light profile, and a mantle-light profile.

12. The method of claim 10, the spectral profile comprising an emphasis profile for emphasizing one or more colors of the object or to affect a perceived color contrast of the object.

13. The method of claim 1, the customized spectral profile comprising a spectral profile for correcting the rendering of an object.

14. The method of claim 13, the spectral profile comprising a profile for correcting the rendering of the object for an eye experiencing loss of vision with respect to one or more colors.

15. A method for generating an optical filter, lamp, or other illuminant comprising generating an optical filter, lamp, or other illuminant from a customized spectral profile, the customized spectral profile being generated by optimizing one or more optical indices of a trial spectrum calculated from measured spectral data of an object, the optimization comprising varying the trial spectrum with respect to one or more corresponding optical indices of a reference spectrum.

16. Computer-readable media comprising instructions for:
generating a trial spectrum;
obtaining a reference spectrum;
calculating one or more optical indices of the trial spectrum;
calculating one or more corresponding optical indices of a reference spectrum; and
varying the trial spectrum to optimize the one or more optical indices of the trial spectrum with respect to the one or more corresponding optical indices of the reference spectrum to generate the customized spectral profile.

17. The computer-readable media of claim 16, further comprising instructions for:
calculating one or more optical indices of a SOURCE spectrum; and
varying the trial spectrum to optimize the one or more optical indices of the trial spectrum with respect to the one or more corresponding optical indices of the SOURCE spectrum to generate the customized spectral profile.

* * * * *